US012579604B2

(12) United States Patent
Vilaj et al.

(10) Patent No.: US 12,579,604 B2
(45) Date of Patent: Mar. 17, 2026

(54) IMAGE REGISTRATION WITH APPLICATION IN TISSUE TREATMENT

(71) Applicant: TECAN TRADING AG, Männedorf (CH)

(72) Inventors: Volfgang Vilaj, Uetikon am See (CH); Alexander Kaser, Puch (CH)

(73) Assignee: TECAN TRADING AG, Männedorf (CH)

( * ) Notice: Subject to any disclaimer, the term of this patent is extended or adjusted under 35 U.S.C. 154(b) by 507 days.

(21) Appl. No.: 17/982,282

(22) Filed: Nov. 7, 2022

(65) Prior Publication Data

US 2023/0147653 A1 May 11, 2023

(30) Foreign Application Priority Data

Nov. 8, 2021 (EP) ..................................... 21206865

(51) Int. Cl.
| | |
|---|---|
| *G06T 3/14* | (2024.01) |
| *G06T 7/00* | (2017.01) |
| *G06T 7/10* | (2017.01) |
| *G06T 7/33* | (2017.01) |

(52) U.S. Cl.
CPC .............. *G06T 3/14* (2024.01); *G06T 7/0012* (2013.01); *G06T 7/10* (2017.01); *G06T 7/337* (2017.01); *G06T 2207/20132* (2013.01); *G06T 2207/20224* (2013.01)

(58) Field of Classification Search
None
See application file for complete search history.

(56) References Cited

U.S. PATENT DOCUMENTS

| | | | | |
|---|---|---|---|---|
| 6,671,386 B1* | 12/2003 | Shimizu | ................ | G06T 1/0064 |
| | | | | 235/382 |
| 2007/0025503 A1* | 2/2007 | Hemmendorff | ........ | A61B 6/502 |
| | | | | 378/37 |
| 2008/0193046 A1* | 8/2008 | Canel-Katz | .......... | H04N 19/593 |
| | | | | 382/282 |
| 2008/0317317 A1* | 12/2008 | Shekhar | .................. | G06T 3/153 |
| | | | | 382/131 |

(Continued)

FOREIGN PATENT DOCUMENTS

| | | |
|---|---|---|
| CN | 105447882 | 2/2018 |
| EP | 3 761 032 | 1/2021 |

(Continued)

OTHER PUBLICATIONS

Wu, Jing. "Rigid Point Registration with Expectation Conditional Maximization." arXiv preprint arXiv:1803.02518 (2018). (Year: 2018).*

(Continued)

*Primary Examiner* — Michelle M Entezari Hausmann
(74) *Attorney, Agent, or Firm* — NIXON & VANDERHYE P.C.

(57) ABSTRACT

Some embodiments are directed to image registration. A rotation angle is determined and subsequently a translation vector. The rotation angle and translation vector together defining an alignment transformation between a first image and a second image. Determining the rotation angle may include iterating over multiple potential rotation angles, and determining alignment.

19 Claims, 13 Drawing Sheets

(56)     References Cited

U.S. PATENT DOCUMENTS

| | | | | |
|---|---|---|---|---|
| 2011/0052038 A1* | 3/2011 | Hayashi | G06V 10/25 | |
| | | | 382/133 | |
| 2012/0092477 A1* | 4/2012 | Kawano | G02B 21/365 | |
| | | | 348/79 | |
| 2014/0147028 A1* | 5/2014 | Zheng | A61B 5/02007 | |
| | | | 382/131 | |
| 2017/0046826 A1* | 2/2017 | Konen | A61B 5/0042 | |
| 2023/0212556 A1* | 7/2023 | DuVall | C12N 15/1093 | |
| | | | 506/4 | |
| 2024/0085304 A1* | 3/2024 | Li | G06N 3/084 | |
| 2024/0094643 A1* | 3/2024 | Alpeggiani | G03F 7/70641 | |
| 2024/0378734 A1* | 11/2024 | Vorobyova | G06T 7/0012 | |

FOREIGN PATENT DOCUMENTS

| | | |
|---|---|---|
| WO | 2020/131070 | 6/2020 |
| WO | 2020/131072 | 6/2020 |
| WO | 2020/132394 | 6/2020 |
| WO | 2020/254250 | 12/2020 |

OTHER PUBLICATIONS

Alba, Alfonso, et al. "Phase correlation based image alignment with subpixel accuracy." Mexican international conference on artificial intelligence. Berlin, Heidelberg: Springer Berlin Heidelberg, 2012. (Year: 2012).*

Barros, Francisco, Pedro J. Sousa, Paulo J. Tavares, and Pedro MGP Moreira. "A DFT-based method for 3D digital image correlation." Procedia Structural Integrity 5 (2017): 1260-1266. (Year: 2017).*

Ho-Gun Ha et al., "Robust subpixel shift estimation using iterative phase correlation of a local region", SPIE, vol. 7241, 2009, pp. 724115-1-724115-9.

Zdenek Hrazdíra et al., "Iterative Phase Correlation Algorithm for High-precision Subpixel Image Registration", The Astrophysical Journal Supplement Series, vol. 247, No. 8, Mar. 2020, 8 pp.

* cited by examiner

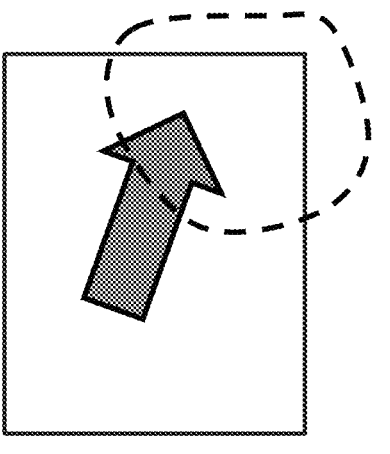
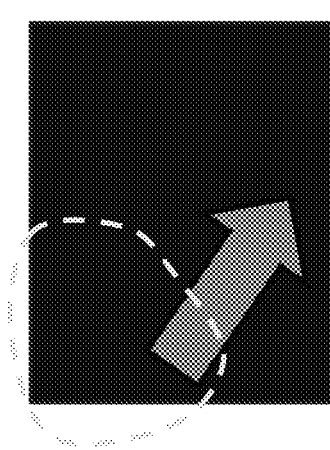
*Fig. 4e.1*          *Fig. 4e.2*

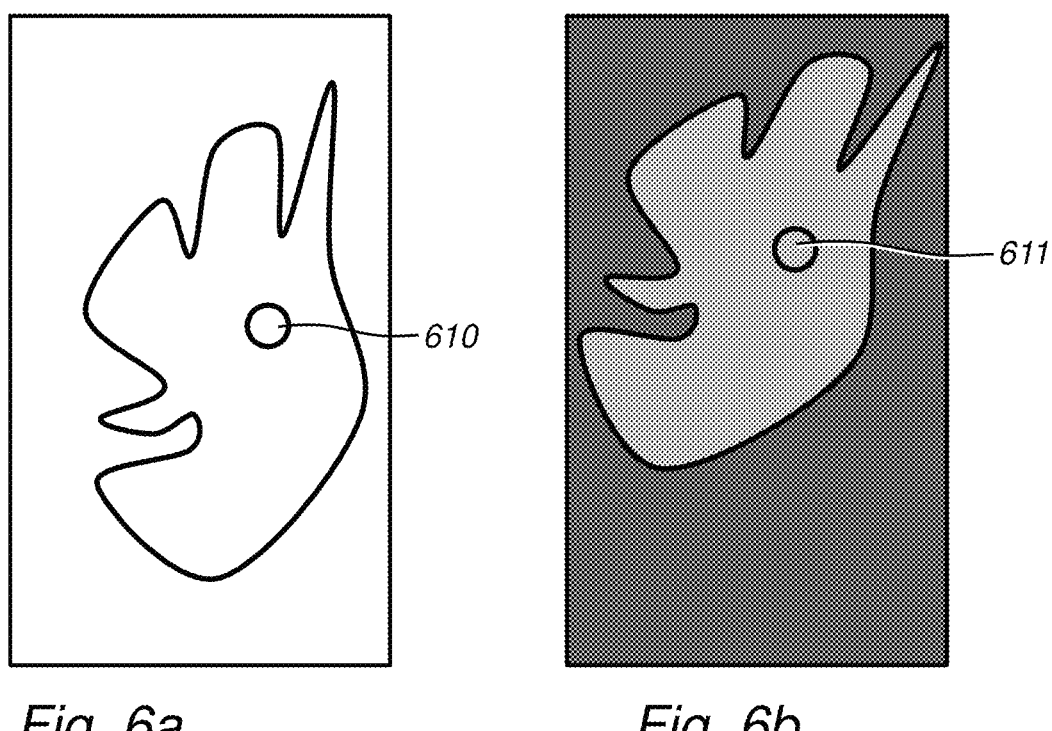
*Fig. 6a*          *Fig. 6b*

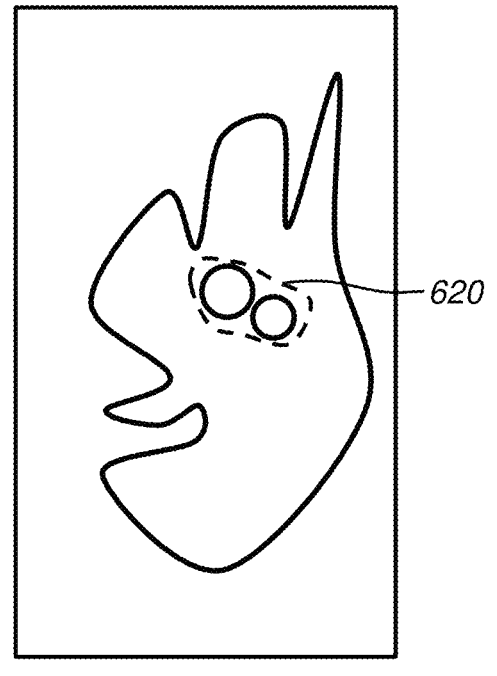
*Fig. 6c*
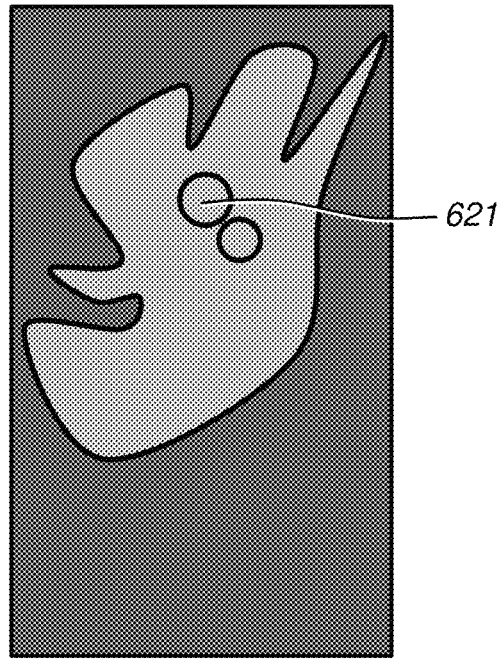
*Fig. 6d.1*
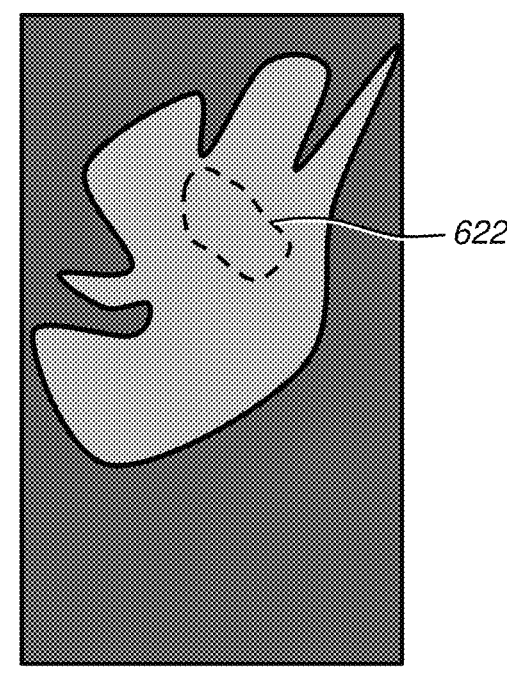
*Fig. 6d.2*

IMAGE REGISTRATION WITH APPLICATION IN TISSUE TREATMENT

This application claims priority to EP 21206865.4 filed Nov. 8, 2021, the entire contents of which are hereby incorporated by reference.

TECHNICAL FIELD

The presently disclosed subject matter relates to an image registration method, a method for tissue treatment, an image registration system, a tissue treatment system, a computer readable medium.

BACKGROUND

Image registration is needed for a variety of applications, in particular, machine vision applications, e.g., automated tissue treatment. For example, suppose, given a first image and a second image, that the second image is identical to the first image, except for a graphical transform that is applied to the first image, then the image registration algorithm aims to recover the transformation. In this application, the graphical transform is typically restricted to combinations of rotations and translations, although combinations of rotations, translations and scaling can also be handled.

In many practical applications, the first image and second image are not identical, and a graphical transform is sought that aligns the images well. Alignment may be defined in a number of ways, e.g., depending on the application. One may take correlation as a measure for alignment for example.

A known image registration algorithm to recover the graphical transform assuming it consists of a translation only is the phase correlation method. For example, one description of the phase correlation method can be found in the paper "Extension of Phase Correlation to Subpixel Registration", by Foroosh, et al. The paper is included herein by reference, in particular for its detail on the phase correlation method, and its sub-pixel improvements thereof.

According to section I of said paper, the phase correlation method is based on the Fourier shift property, which states that a shift in the coordinate frames of two functions is transformed in the Fourier domain as linear phase differences. Accordingly, given two functions each of two variables (which may represent an image), one computes the normalized cross power spectrum from the product of the Fourier transforms of the two functions, then computes the inverse Fourier transform, and finally one finds the maximum value. The coordinates of the maximum value indicate a translation vector between the two functions, e.g., images, to align them. The cited publication notes that the phase correlation method is remarkably accurate and notably robust to various types of noise.

The basic form of the phase correlation method produces a translation vector that aligns one image to another. The method can be adapted to determine rotation and scaling differences between two images by first converting the images to log-polar coordinates. A translation vector found with the phase correlation method for the converted images, corresponds to a rotation and scaling of the unconverted images. One can then find the translation vector with a second application of the phase correlation method on the original images in which one is rotated and scaled.

Although the above publication praises the accuracy and robustness of the phase correlation method, the inventors found that there is room for improvement in this area. In particular, when the two images have different lighting, the method was found to break down.

SUMMARY

The problems with the known image registration method become particularly apparent when registering images of tissues, when these images differ in lighting and/or staining.

Consider for example, the international patent application WO2020131070, with title "Method of treating a sample", and included herein by reference, discloses a method of treating an isolated area of a sample with a liquid. A known method disclosed therein comprises the steps of:

generating an isolated area of a sample by means of a first fluid reservoir, the first fluid reservoir enclosing a distal end of a second fluid reservoir, and the isolated area of the sample being sealed towards the remaining area of the sample, bringing the isolated area of the sample into fluid connection with the second fluid reservoir, dispensing a fluid from the second fluid reservoir into the first fluid reservoir, thereby generating a fluid flow on the sample at the isolated area in a first direction, and aspirating the fluid from the first fluid reservoir into the second fluid reservoir, thereby generating a fluid flow on the sample at the isolated area in a second direction.

For example, FIG. 9 of the above patent application shows a microscope image of a formalin fixed paraffin embedded (FFPE) section of a tissue. The corresponding description gives an example of treatment of the slide comprising the tissue section. FIG. 9 is a dark field image showing the locations where the tissue was treated. Treating a location on the tissue with a liquid, in particular, to detach part of the tissue, is an example of tissue treatment. In particular, lysing a tissue at a location to detach part of the tissue, is an example of treating the tissue at the location.

When identifying the locations where treatment, in this example, lysing, is to take place, it is preferred to use a different image, e.g., a bright field image, rather than a dark field image, and/or to use a stained tissue image rather than an unstained tissue image. Tissue treatment may comprise tissue detachment, that is localized tissue detachment; Tissue treatment may comprise applying a fluid, e.g., a staining, and/or imaging to a location on the tissue, etc. Tissue treatment may include physical treatment, e.g., scraping.

In an embodiment, two different images are used. A first image is used for defining locations, while a second image is used to steer the treatment process and/or to monitor its process. Location(s) defined with respect to the first image are transferred to the second image, which in turn is preferably done by registering the two images with each other. In an embodiment, two different image types are used. A first image type is used for defining locations, while a second image type is used to steer the treatment process and/or to monitor its process. Registering images may be used for other purposes than tissue treatment, e.g., to stich images together to create one new image covering a larger area, e.g., to combine images, to obtain one higher quality image, e.g., to increase resolution, and/or to increase the dynamic range.

For example, when applying tissue treatment, it is desirable, that the treatment occurs in a desired location. For example, a location may comprise a point or region where treatment, e.g., detachment, is to take place. For example, a location may comprise two coordinates, indicating a particular point. For example, a location may comprise two coordinates and a radius, indicating a disc-shaped region. For example, a location may comprise a boundary indicating a region.

For example, part of the tissue may be of interest for clinical or other reasons, so that the tissue treatment should take place at those locations. When an image is available of the tissue slice before treatment takes place, one could in principle point out or determine the desired locations on that image. There can be various reasons why the location is identified on another image, e.g., not on a direct image of the tissue just before treatment. For example, interesting locations, e.g., medically, or scientifically, interesting locations may be better visible in one type of image than in another. For example, locations may be defined once, on one first image, but may be transferred multiple times to multiple second images.

For example, treatment may have to take place on multiple tissue slices, at the same locations. In that case, it is desired to translate an image on one image to a next image. For example, this may be needed to collect enough tissue material.

For example, desired locations may be identified in a different image and possibly at a different time and/or location than the images used for treatment. For example, desired locations may be identified in a stained image, while treatment uses unstained tissues. Accordingly, the image in which desired locations are identified is different from an image taken from a tissue before treatment.

For example, locations may be identified in an image taken under different lighting conditions. For example, a bright field image may be preferred to identify locations, e.g., for a human, or for an image recognition algorithm. However, to steer a motorized treatment tip, a dark field image may be preferred. For example, bright field lighting may be preferred for its high contrast, while dark field images may be preferred for its uniform appears, reduction of specular glare, and visibility of texture. For example, for unstained tissues a dark field image is preferred because it gives a higher contrast; in the bright filed configuration an unstained tissue is hardly visible. On the other hand, a tissue with a cover glass is not visible in darkfield. A cover glass is commonly applied to stained images, in particular to H&E stained tissue, so that for such images a bright field image is preferred.

Accordingly, a location identified on a first image, e.g., of a first type, e.g., a first lighting type, may have to be transferred to a second image, e.g., of a second type, e.g., a second lighting type. Bright field images are also known as white field images.

Transferring locations from one image to another, may be done by registering the images with each other, e.g., determining a graphical transformation, that transforms a first image to a second image. Once the transformation is known, a location on the first image can be transferred by applying the same transformation to obtain a location on the second image. For example, a location of interest may be identified for a first image, while a second image may be used to steer a motorized treatment tip.

More generally, as analysis may be done on different images, it may be needed to register the images with each other.

Unfortunately, the known image registration algorithms do not perform satisfactorily. Extensive experimentation with the phase correlation method, and its extension to log-polar transformed images, were disappointing. Although the known method works well on similar and conventional images, the results were of such low accuracy that they were unusable, especially when registering images with different lighting, especially, bright field versus dark field lighting.

For example, in an embodiment, a user may define multiple locations on a first image, e.g., a first image of a first tissue slice. For example, the first image may be of a stained tissue and/or may be a bright field image. Before or during treatment of the tissue at the defined location, a second image of the tissue is taken. The second image need not be the same tissue slice, e.g., it could be a next slice of the same tissue. The first and second image may not perfectly align; especially if the images are of different tissue slices. For example, the tissue slices may be at different locations on a slide, the slide and camera may be positioned different in relation to each other and so on. In an embodiment, the first image is registered with the second image, and a defined location on the first image is transferred to the second image. Tissue treatment, e.g., lysing, scraping or the like may then take place at the transferred location. The transferred location in the second image may correspond to a physical location on the corresponding tissue slice, where treatment is to take place.

A registering device and/or treatment device is an electronic device, which may comprise a computer, e.g., to register two images and/or to control the tissue treatment process, e.g., lysing, scraping, and the like. The registering method described herein enables more accurate tissue treatment as locations defined for a first image are transferred to a second image more accurately.

An aspect is a registering method and/or a tissue treatment method. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, registration of a first image and a second image comprises selecting a rotation angle, e.g., with best alignment, and optionally selecting a translation vector, e.g., with best alignment. Once a registration has been established between the first image and the second image, the registration may be used to transfer locations from one image to another, e.g., from the first image to the second, or vice versa. For example, an embodiment may comprise obtaining a first location on the first image, and transferring the first location on the first image to a second location on the second image according to the image registration. For example, the image registration, e.g., rotation, translation, possibly even scaling, may be applied to the first location to obtain the second location. For example, tissue treatment, e.g., detachment of tissue, may then be done local to the second location.

The location on an image to transfer may be selected by a user. For example, an embodiment may comprise displaying the first image to a user, and enabling the user to define the location through a user interface. Instead or in addition, markings may be applied in the image; an embodiment may comprise for example detecting a marking on the first image indicating the first location. A marking in the first image may be applied by a further software application, which might even be a third party software application. Interestingly, the marking may be directly applied on the slide or on the tissue, so that the marking will be photographed and thus appear in the first image. Detecting such marking can be done in various automated manners, e.g., detecting the color of the marking, using image recognition, and the like.

Transfer of a location from one image to another may be fully automated, without requiring further user confirmation. Typically, registration between two images according to an embodiment is very good, so that confirmation is not typically needed. However, it may happen that one registration is less good than typical. This can be resolved with use confirmation, but this would slow down the process considerably while in most situations it is not needed. In an embodiment, the quality of the image registration is used to ask for confirmation or not. For example, an embodiment may comprise: if determined alignment is lower than a first threshold, asking for user verification for the second location on the second image, and/or if the determined alignment is higher than a second threshold, not asking for user verification for the second location on the second image.

Transfer of locations in the first or second image, may be included in various embodiments, e.g., of registration methods, of registration devices, systems, or processing devices and systems. Transfer methods or devices can stand on their own as well, e.g., receiving as input a registration according to an embodiment.

Transfer of locations is not necessary. For example, an embodiment may advantageously output the image registration to further devices or software, e.g., downstream devices or software. Note that a registration device does not need to be integrated with other devices, e.g., with cameras or processing devices, nor even have to be near such. For example, a registration embodiment may be offered over a computer network, e.g., as an online service. For example, such an online service may receive (at least) two images and return an image registration. Such a service might not itself use the image registration.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 schematically shows an example of an embodiment of a tissue treatment device, FIG. 2a schematically shows an example of an embodiment of a tissue treatment system, FIG. 2b schematically shows an example of an embodiment of a tissue treatment system, FIG. 3 schematically shows an example of an embodiment of an image registration system, FIG. 4a schematically shows an example of an embodiment of a bright field image, FIG. 4b schematically shows an example of an embodiment of a dark field image, FIGS. 4c.1-4c.3 schematically show examples of an embodiment of a rotated bright field image, FIGS. 4d.1-4d.3 schematically show examples of an embodiment of a translated and rotated bright field image, FIGS. 4e.1 and 4e.2 schematically show examples of an embodiment of an exclusion area in a bright field and dark field image.

REFERENCE SIGNS LIST

Figure 1:
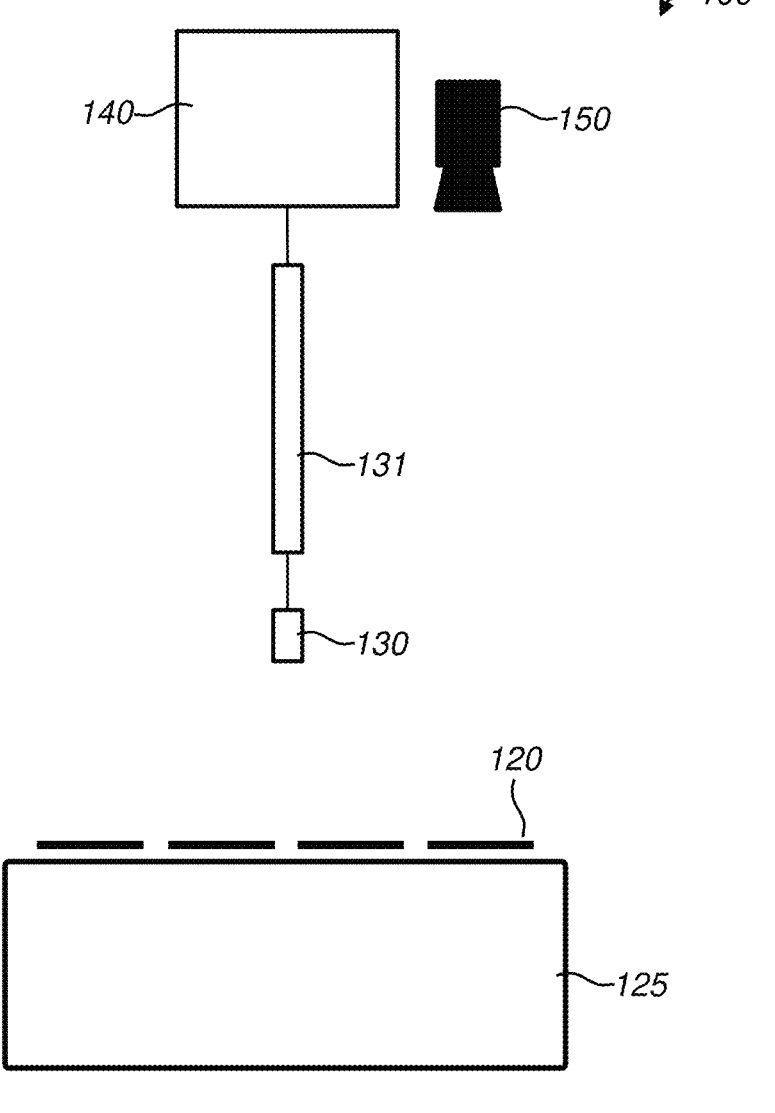

The following list of references and abbreviations corresponds to FIGS. 1-6f.2, and 8a-8b, and is provided for facilitating the interpretation of the drawings and shall not be construed as limiting the claims.

100 a tissue treatment device
120 a slide
125 a slide support
130 treatment tip
131 a treatment arm
140 a tissue treatment unit
150 a camera
200, 201 a treatment system
210 a registration device
230, 270 a processor system
240, 280 a storage
250, 290 a communication interface
260 a tissue treatment device
265 a treatment apparatus
266 a camera
300 a registration system
310 image preprocessing part
311 a first image
312 a second image
320 a rotation searching unit
322 a rotation unit 324 a first matching unit
330 a translation searching unit
332 a translation unit
334 a second matching unit
340 an application unit
350 a treatment apparatus
610 a location
611 a transferred location
620 an area
621 a transferred location
622 a transferred area
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

There are two conventional algorithms for image registration of a first and a second image. The first known algorithm is phase correlation. Phase correlation is an algorithm to estimate the relative translative offset between two similar images. It relies on a frequency-domain representation of the data, usually calculated by fast Fourier transforms. If the transformation between two images only comprises a translation, or can be well approximated by a translation, then one can use this approach. For example, to perform phase correlation between a first image and a second image, one can perform the following algorithm: 1. Compute the DFT of the first image and the DFT of the second image; 2. multiply the results point-wise and perform IDFT (inverse DFT); 3. find the maximum in the latter. The coordinates of the pixel with the maximum value corresponds to a translation vector over which an image can be translated so that they best correlate.

The result of the inverse FFT is a correlation Matrix. For example, the vector from the center to the highest value of the matrix corresponds to the translation vector over which the second image can be translated so that the images correlate best. If the center is at the origin the coordinates of the highest value directly correspond to the translation vector.

If the transformation between the two images involves a rotation angle, a second known algorithm is to first transform the two images to log-polar coordinates. The phase correlation algorithm now gives the best angle to rotate an image over in order to find the best correlation. A subsequent step may be to find a translation vector, e.g., by performing the phase correlation algorithm on the images without the polar-log transform.

The known log-polar transform reduces angle estimation to just one convolution, and the finding of a maximum value. A conventional angle estimation comprises log-polar transform of the two images, followed by phase correlation. Although the conventional algorithm can give satisfactory results for some images, in some settings the known algorithm breaks down and its results are not even approximately correct. Intensive testing found that the rotation angle and translation vector often fail to match up the images. In particular, these problems were encountered in the context of tissue matching. In particular, if the first image is a bright field image, and the second image is a dark field image, the results are unsatisfactorily. If the images are downscaled, e.g., to improve the performance of the log-polar transformation, the angle estimation becomes even worse.

In an embodiment, image registration is done in two phases. In a first phase, the angle phase, a rotation angle is estimated. In a second phase, a translation vector is estimated. This algorithm assumes that a satisfactory alignment will be obtained by a combination of a rotation and a translation. Such a transformation between the two images can be expected if the two images are taken from a camera with the same perspective, e.g., are both taken with camera 150. If needed, though, optionally the first phase can be extended to also include a scaling factor. Alternatively, an optional scaling estimation phase can be done in a preceding stage, e.g., before estimating the angle. Scaling estimation is optional as it often is not needed, e.g., because the images are known to have the same or approximately the same scale. Nevertheless, adding a scaling component to the registering transformation is possible, and may be useful. For example, the angle phase may be extended to a combined angle and scale phase in which an iteration over multiple combination of a scaling operation and rotation are tried for best alignment.

In an embodiment, the angle estimation phase may comprise iterating over multiple potential rotation angles. For each potential rotation angle, the first image is rotated over the potential rotation angle, and the alignment between the rotated first image and the second image is determined. At the end, the potential rotation angle that gave the best alignment is then selected as the rotation angle. After the angle estimation phase, the first image can be rotated over the selected rotation angle and a translation vector can be found in a translation phase.

The level of alignment between the first image, rotated over a potential rotation angle and the second image can be found in various ways, but an efficient way to do this is to use phase correlation. For example, phase correlation may be applied to the rotated first image and the second image. For example, one may compute the DFT of image1 and of rotated image2, multiply the results point-wise and perform IDFT; find the maximum in the latter. The maximum value is an indication of the alignment. Note that no log-polar transform is used or needed to obtain this value. For example, in case of normalized cross correlation the correlation value is a number between −1 and 1, where 1 means the images are identical, and −1 means the images identical but inverted. Note that in a situation in which the images which are to be registered happen to be mostly inverted, the alignment may optimize towards minimal correlation, e.g., towards −1, instead of maximizing correlation, e.g., towards 1. Alternatively, one of the images may be inverted; Another option is to do background subtraction for one image but not the other.

The coordinates are an indication of the translation vector that would be needed between the rotated first image and the unrotated second image. One could use that translation vector to complement the rotation angle and to complete the graphical transform from the first image to the second image, e.g., the combination of applying the rotation and translation. The inventor found however, that this is not optimal. In an embodiment, only the maximum value from phase correlation between an image rotated over a potential angle and the non-rotated image is used. The maximum value is used as an indication of the alignment between the two images. The coordinates of the pixel where the maximum value is found may not be used at all in this embodiment, or may be used only as an initial approximation of the translation vector.

In the translation phase, a translation vector is searched to go with the angle found in the angle phase. One embodiment of the translation phase is to iterate over the potential translation vectors. For each potential translation vector, the alignment between the translated and rotated first image and the second image is determined. The best translation is then selected. As noted, an alternative, but less optimal approach is to use the known phase correlation algorithm to find the translation vector between one image rotated over the found angle, and the non-rotated image.

To improve performance, searching for the angle may be done on down-sampled images. Searching for the translation vector is preferably done on non-down-sampled images. Experiments confirmed that one obtains better alignment by comparing images that have not been downscaled, in the second translation phase. This can be done when iterating over possible translation vectors as well as for phase correlation.

In an embodiment, a stained and unstained tissue is captured with a camera using different lighting, e.g., different light sources, e.g., dark field versus bright field. The image of the stained tissue is aligned to the image of the unstained tissue by an embodiment of the image registration algorithm so that manual alignment is not required.

FIG. 1 schematically shows an example of an embodiment of a tissue treatment device 100. Tissue treatment device 100 is an example of a tissue treatment device that may be used in or with an embodiment, e.g., an embodiment of an image registration method or image registration device. Tissue treatment device 100 may have image registration functionality, e.g., comprise an image registration device, or may be combined with an image registration device.

Shown in FIG. 1a is a slide 120. Slide 120 is arranged for a tissue section, e.g., tissue slice, to be applied to a slide surface. Parts of the tissue section are to be treated, in particular, tissue may be detached from the location. A particular important example of tissue treatment is tissue detachment. Tissue detachment may be done by lysing. For example, a lysing fluid may be applied at a location by a lysing tip, e.g., a pipetting tip, the lysed tissue may then be aspirated back. The lysed tissue can then be used for further processing, e.g., to extract biological molecules, e.g., proteins, DNA molecules, etc. For example, the tissue may be a biopsy tissue. Slide 120 is shown on top of a slide support 125. Tissue detachment may be done by scraping or by laser instead; for example, the treatment tip may comprise a scraping tip. With the lysing a localized detachment of tissue is obtained.

Tissue treatment device 100 comprises a treatment arm 131 with a treatment tip 130 at an end of the treatment arm. The slide surface of slide 120 is facing the treatment tip 130. Treatment tip 130 is movable and can be configured for treatment tip 130 to move to a particular defined location on the tissue section. Typically, treatment arm 131 is motorized and arranged to be controlled by a program. The program may instruct the treatment arm 131 and tip 130 for tissue treatment at one or more locations on the tissue section. For example, treatment arm 131 may be part of a robotic arm arranged to move tip 130 to a desired location on the tissue section. For example, the treatment tip may comprise a pipetting tip, e.g., for chemical detachment of tissue. For example, a pipetting tip may be arranged for application of a fluid and/or aspiration of a fluid, e.g., for lysing the tissue at the location. A pipetting tip may be configured to enable the controlled exposure of chemicals to the tissue at the defined location. The tip may also allow dynamic fluid forces at the location to further promote tissue treatment of the tissue section at the location. For example, shear forces may be applied to the tissue through the fluid. For example, the treatment tip may be a scraper, e.g., for mechanical and localized detachment of tissue.

In an embodiment, treatment tip 130 is arranged to extract biomolecules from the tissue material, such as one or more of nucleic acids, proteins, lipids, and hormones. For example, a pipetting tip may be configured to lyse the tissue material, and to aspirate the lysate. For example, a scraping tip may be configured to scrape the tissue material. From the lysate or scraped tissue, biomolecules can be extracted, in particular, DNA molecules, more in particular double-stranded DNA molecules (dsDNA).

The location on the tissue section, e.g., a part or area or region of the tissue section, comprises the material that is to be detached, e.g., to be lysed. The location is also referred to as the area of interest (AoI). The size of the location may be determined by the size of the treatment tip 130. Often a circular shape is taken for the treatment tip 130, and for the location, but this is not necessary. For example, the location may comprise a circular area defined by the corresponding inner diameter of a tissue treatment chamber. Other shapes, say triangular, or the like is possible, and may even be advantageous if, say multiple locations are to be combined to maximize the amount of tissue detached from the tissue section. For example, the location may comprise an area whose shape is defined by the corresponding shape of a tissue treatment chamber. The location may comprise an area defined by the corresponding dimension of a scraping pipetting tip. The size of the location may be defined by a spot size or beam diameter of a laser beam used for treatment, e.g., the half-power beam width.

A tissue treatment unit 140 may be configured to move treatment tip 131 to the location on the tissue section, and to treat the tissue as appropriate, e.g., supply, and aspirate fluids to and from treatment tip 131, and/or scrape the tissue, and so on.

Further information on and examples of pipetting tips can be found, e.g., in international patent publications WO2020131072 and WO2020132394, both of which are included herein by reference.

Further information on and examples of mechanical detachment tips, e.g., scraping can be found, e.g., in international patent publications WO2020254250A1, which is included herein by reference. Said publication discloses an apparatus comprising a dissection tool for mechanical detachment of biological material from a tissue sample disposed on a slide. A gouging head is configured to engage with the slide, relative movement between the platform and the dissection tool causes a front face of the gouging head to gouge a track though the tissue sample.

Returning to FIG. 1, by moving the pipetting tip to a location of interest and detaching the tissue at that location, some part of the tissue is obtained in unit 140 where it can be further processed. Detachment of tissue in this manner, especially automated or partially automated, is advantageous, as it is quick and reliable.

For example, tissue may be detached by one or more lysing iterations. In a lysing iteration, lysing fluid may be provided to the lysis chamber at the end of the pipetting tip, and after some time, aspirated back together with lysed material. The time the lysing fluid is in the chamber, as well as other factors, have an impact on the amount of material that is detached from the tissue slide.

A camera 150 may be included in tissue treatment device 100 to take images of the tissue section in various stages of tissue detachment. For example, an embodiment may comprise taking a first image, moving the treatment tip into position to detach tissue at the defined location. An image may also be taken before the first lysing, e.g., from a possibly stained tissue slice, possibly using different lighting, e.g., bright field. For example, camera 150 may be used to take a first image of a tissue slice, e.g., using bright field lighting, of a first tissue slice. The slide 120 containing the tissue slice may then be removed, e.g., motorized, and a second slide with a second slice may be moved under camera 150 and treatment tip 130. Camera 130 may take a second image of the second tissue slice. The first and second image may be registered, e.g., by unit 140, or another processing unit. One or more locations defined for the first image are then transferred to the second image. The second tissue slice is now in position for treatment. As the tissue slice has not moved since the second image was taken, the locations on the image can directly be used to steer the treatment arm. For example, a slide or a background may comprise a fiducial to further aid calibration of arm and camera image.

Capturing the first image may be at a different time, a different location and may even use a different camera. Using camera 150 for the first image is preferable as it reduces the difference between the first and second image, and thus reduces the amount of registration needed; but this is not needed. In particular, using camera 150 reduces or even obviates the need to take scaling into account for image registration.

For example, in an embodiment, a first image is taken at a first moment, e.g., by camera 150, locations are defined for the first image. Later the second image is taken, the images are registered and treatment can commence.

Locations may be identified on the first tissue slice, e.g., by a user, or an algorithm, e.g., an image recognition algorithm configured to identify at-risk tissue in the tissue slice, e.g., to identify cancer cells in the tissue slice, Moving the treatment tip to and from the defined location may be done with a movable, e.g., motorized arm. For example, a robotic arm may be used. In an embodiment camera 150 may be used to guide arm towards the defined location, although this is not necessary. Slide 120 may comprise one or more fiducials to aid in locating the defined location in the camera image. Camera 150 and/or said fiducials may be used by guiding software configured to guide treatment arm 131 to the defined location.

In an embodiment, the treatment tip is moved parallel to tissue slide 120; creating an optical path from camera 150 to the tissue slice. In FIG. 1*a*, the camera is shown above the tissue section, but this is not necessary. For example, the optical path may comprise angles, e.g., by including one or more mirrors in the optical path. This allows the camera to be located at a different position, away from the treatment unit.

In an embodiment, the treatment tip is moved orthogonal to tissue slide 120; creating an optical path from camera 150 to the defined location. For example, camera 150 may be attached to pipetting tip 130 or arm 131. By moving orthogonally away from tissue slide 120, an optical path is created for camera 150 to take an image of the tissue slice.

Combinations of parallel and/or orthogonal movement are possible, with or without using optical elements such as mirrors, optical fibers, and the like. The camera may be a conventional camera or a fiber optic camera.

Figure 2A:
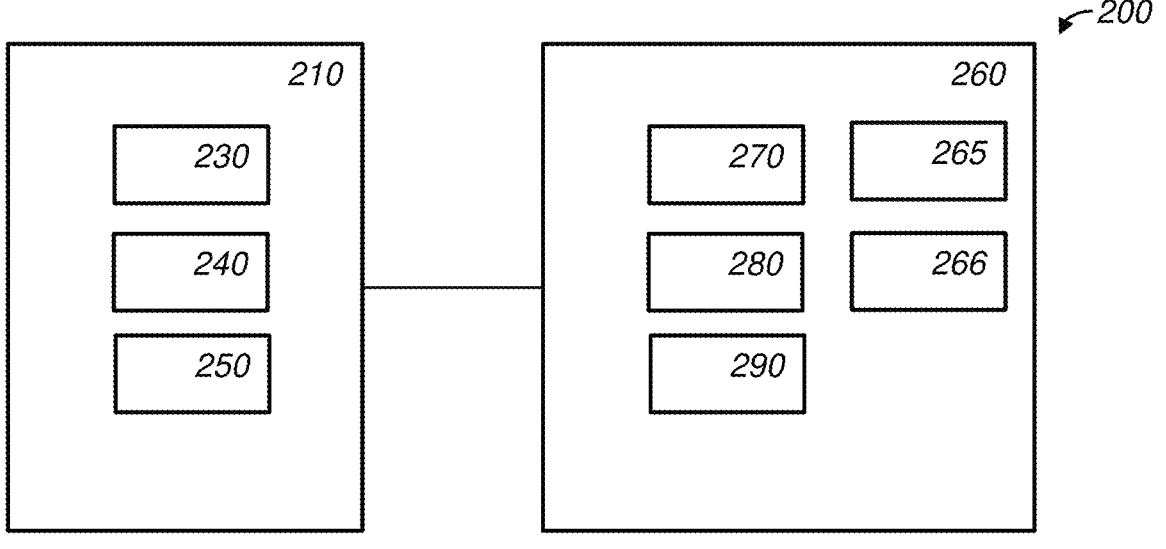

FIG. 2*a* schematically shows an example of an embodiment of a treatment system 200. Treatment system 200 comprises an image registration device 210 and a treatment device 260. Treatment device 260 is configured for executing a tissue treatment at a defined location on a tissue slice. Multiple locations may be defined for a tissue slice. For example, treatment may comprise a detachment treatment. For example, detachment may be done chemically, e.g., using lysing, or mechanically, e.g., scraping.

Image registration device 210 may comprise a processor system 230, a storage 240, and a communication interface 250. Treatment device 260 may comprise a processor system 270, a storage 280, and a communication interface 290. Treatment device 260 may further comprise treatment apparatus 265 and a camera 266. For example, the treatment apparatus 265 may comprise a mechanism to perform a treatment at a defined location, e.g., a lysing unit or the like. For example, camera 266 may be configured to image the tissue slice, possibly multiple times at successive stages of treatment cycles. For example, camera 266 may be configured to image a first tissue slice to obtain a first image, e.g., under first conditions, e.g., staining or lighting conditions. For example, camera 266 may be configured to image a second tissue slice to obtain a second image, e.g., under second conditions, e.g., staining or lighting conditions. The first and second tissue slice could be the same slice, e.g., if only the lighting conditions are different, but typically, first and second tissue slice are different tissue slices, though typically from the same tissue, e.g., the slice may be neighboring slices, or even consecutive slices of a tissue.

The treatment apparatus 265 may be configured to perform the treatment operations, e.g., moving the treatment arm, and treatment at a location of the tissue section.

Storage 240 and/or 280 may comprise local storage, e.g., a local hard drive or electronic memory. Storage 240 and/or 280 may comprise non-local storage, e.g., cloud storage. In the latter case, storage 240 and/or 280 may comprise a storage interface to the non-local storage.

Image registration device 210 and/or treatment device 260 may communicate internally, with each other, with other systems, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

For example, in an embodiment, treatment device 260 takes an image of a tissue slice. Registration device 210 performs image registration between the said image and an earlier image for which locations are defined. The defined locations are then transferred to the image of the tissue slice, and treatment can be performed. The earlier image can be obtained in registration device 210 from treatment device 260, possibly at a different time, or from some other camera system.

In system 200, the communication interfaces 250 and 290 may be used to send or receive digital data. For example, treatment device 260 may send digital images representing tissue slices to image registration device 210. For example, image registration device 210 may send registration parameters, and/or locations to treatment device 260.

The execution of system 200, image registration device 210 and/or treatment device 260 may be implemented in a processor system, e.g., one or more processor circuits, e.g., microprocessors, examples of which are shown herein. The processor system may comprise one or more GPUs and/or CPUs. System 200, and/or devices 210 and 260 may comprise multiple processors, which may be distributed over different locations. For example, system 200 may use cloud computing.

System 200, image registration device 210 and/or treatment device 260 may comprise functional units that may be functional units of the processor system. For example, these may be used as a blueprint of a possible functional organization of the processor system. The processor circuit(s) are not shown separate from the units in some of the figures. For example, the functional units shown in FIG. 2c may be wholly or partially implemented in computer instructions that are stored at system 200, image registration device 210 and/or treatment device 260, e.g., in an electronic memory thereof, and are executable by a microprocessor thereof. In hybrid embodiments, functional units are implemented partially in hardware, e.g., as coprocessors, e.g., image processor for analyzing digital images including a defined location, and partially in software stored and executed on system 200.

Figure 2B:
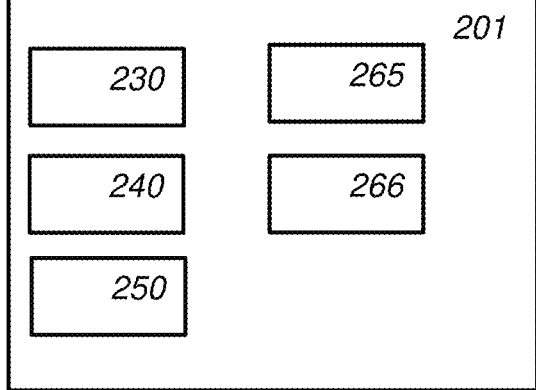

FIG. 2b schematically shows an example of an embodiment of a treatment system 201 in which image registration device and treatment device are integrated. For example, a processor system 230, a storage 240, and a communication interface 250 may be configured to perform the tasks needed for the treatment part of system 201 in addition to the image registration tasks.

In an embodiment, a treatment device, e.g., treatment device 260, combined device 201, is configured to receive a slide having a tissue section applied on the slide surface. For example, the slide may be a glass slide, or some other appropriate material. The treatment device is further configured to perform treatment at a defined location on the tissue section, e.g., using a motorized treatment tip and imaging the tissue section(s) using a camera. The images show the defined locations, and typically also some of the surrounding tissue. The images may have a fixed perspective, e.g., obtained from a camera at a fixed location. The tissue slices may not be at a fixed position relative to the slides. The relative position of the slides to the camera may be easier fixed, but may not be entirely fixed either. Both positional variations can be resolved with image registration.

In an embodiment, the tissue section is paraffined and/or formalin fixed. It is not necessary to restrict to FFPE tissue.

The defined location may be defined by a user. For example, the user may define the defined location by defining coordinates that indicate the defined location in a first image. For example, the treatment device may be configured to image the slide before treatment obtaining a second image. The first image may be displayed in a user interface configured to enable the user to define the location. For example, the user may indicate in a user interface the coordinates or the position in the first image, etc. The defined location may be defined by an algorithm. For example, an algorithm may define a location where treatment is to take place. For example, an algorithm may define one or more locations of interest, where the tissue appearance diverges from regular tissue. For example, an image recognition algorithm, e.g., a neural network may identify locations where tissue is suspect, e.g., diverges from a norm. For example, the image recognition algorithm may be configured to receive the first image as input, and to produce one or more locations as output.

In an embodiment, the defined location is defined by a user, e.g., through a user interface. For example, the treatment device may be configured to image the tissue section before treatment, displaying said image in a user interface configured to enable the user to define the location.

For example, a packing algorithm may define multiple locations, which together lyse the tissue section, e.g., a large part thereof. For example, a circle packing algorithm may be used if the area at the defined location is circular. A packing algorithm improves the yield of the collected lysate. For example, a user may define an area for treatment that is larger than a single treatment area. The packing algorithm may select multiple locations in the area for treatment so that the corresponding treatment areas occupy the area for treatment. For example, the packing algorithm may perform multiple optimization iterations to improve a packing of treatment area in the area for treatment.

The locations defined for the first image can be transferred to the second image. The transferred locations can then be used to steer the treatment arm and tip.

Figure 3:
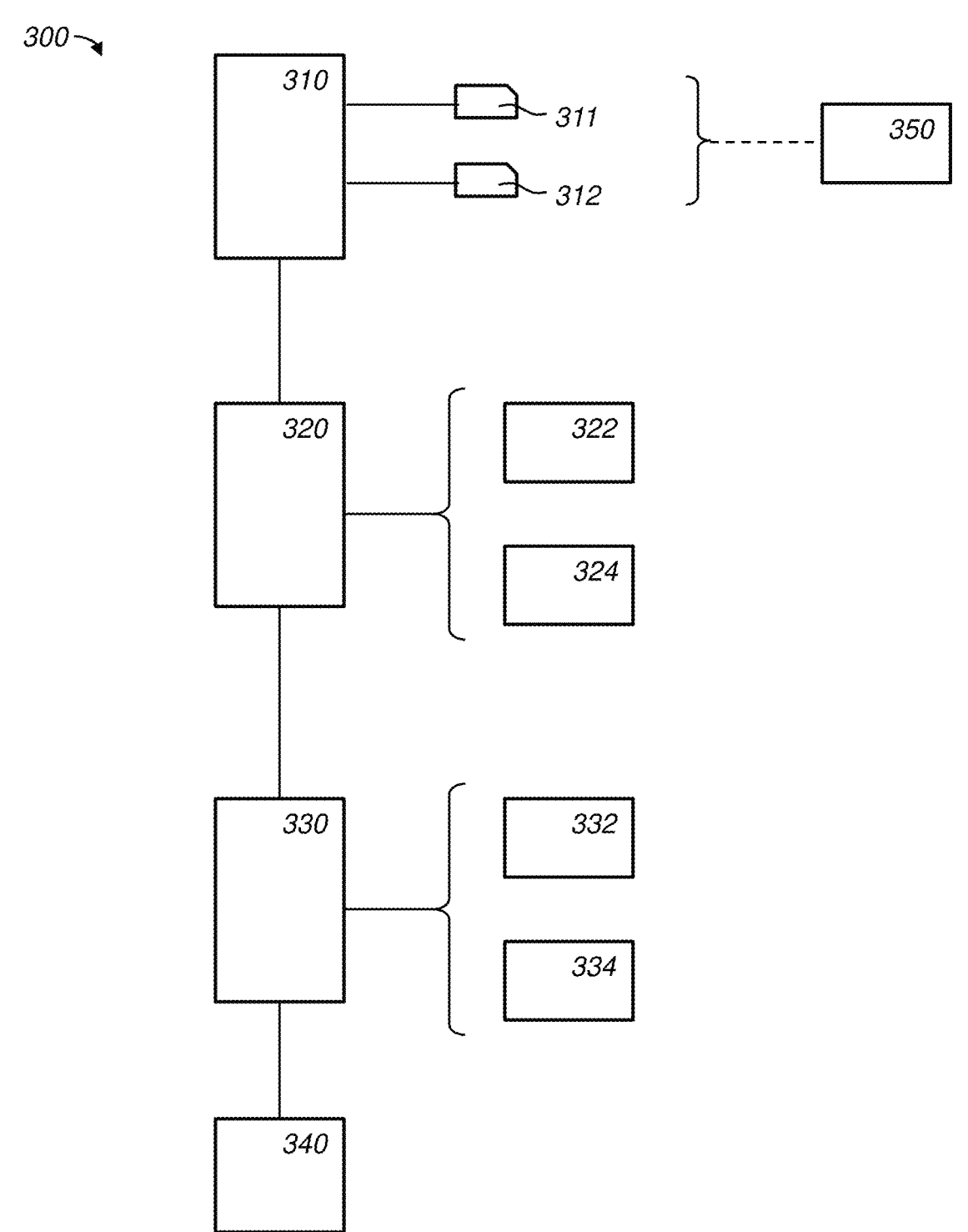

FIG. 3 schematically shows an example of an embodiment of an image registration system 300. Image registration system 300 may be a stand-alone service, e.g., not coupled to a tissue treatment device. For example, system 300 may be implemented in a server, in the cloud, or the like, and configured to receive two or more images for alignment, and to return a transform between the images. System 300 may also receive locations and return transferred locations. System 300 may be implemented in a single device or distributed over multiple devices.

System 300 may be combined, e.g., integrated, with a tissue treatment device. System 300 may be implemented in device 210 or 201.

System 300 is configured to obtain a first image 311 and a second image 312. Some operations are described herein with reference to the first image, e.g., rotating or translating the image to find an angle or translation vector. These embodiments can be adapted by performing such operations on the second image instead. The interchanging can be done between phases as well. For example, one can rotate the first image to find the angle, but shift the second image to find the translation vector.

The first image 311 and the second image 312 are typically obtained from a camera, e.g., camera 150 or camera 266, e.g., a camera in a tissue treatment device 350. This is not necessary though, as the algorithm can be used to align any two images.

In an embodiment, first image 311 and second image 312 are taken under different lighting conditions. For the algorithm this is not necessary, as the algorithm will perform well on images with equal or similar lighting conditions, however, experiments found that an image registration algorithm according to an embodiment is especially advantageous when lighting conditions differ, as the conventional registration algorithms break down in that scenario.

For the alignment it is not necessary that the images are equal. For example, they may be tissue slice images that are from the same tissue, e.g., neighboring slices, though not necessarily consecutive slices. The tissue may be a tissue sample, e.g., a tissue sample of human or animal origin. The tissue may be a tissue sample of non-human or animal origin, e.g., plant tissue.

For example, one of the images may be treated, e.g., stained, while the other is not. In an embodiment, the first image is a bright field image of a stained tissue, while the second image is dark field image of an unstained tissue.

For example, the first tissue slice may be received on a first slide, and the second tissue slice is received on a second slide. The two slides may be imaged by the same camera, though with different lighting, e.g., different light sources, different backgrounds and the like. The sides of the slides may or may not be in the image.

In an embodiment, multiple second images are received. For example, a first image may be a stained reference image, while the multiple second images are unstained. The image registration may be repeated between the first image and each of the multiple second images in turn. In an embodiment, image registration is done between the multiple second images. For example, say the first image is image a, and the multiple second images are $b_1, \ldots, b_n$.

Image registration may be done between images a and $b_1$, between images a and $b_2$, between images a and $b_3$, and so on. In this way, image registration is done between the first image and each of the second images directly, to obtain a transform from a to each of the $b_i$. Alternatively, or in addition, image registration may be done between images a and $b_1$, and between consecutive second images, e.g., between images $b_1$ and $b_2$, between images $b_2$ and $b_3$ and so on. The image transform can then be found by concatenating the transforms, thus also obtaining a transform from a to each of the $b_i$.

Each image $b_i$ may represent an image of a tissue slice on a separate slide, but this is not necessary. A single slide may hold multiple tissue slices, the $b_i$ may represent a tissue slice isolated from a slide image. More conveniently, multiple registrations from a to each of the tissue slice images on $b_i$ may be computed, so that a single location defined for a first image a may correspond to multiple locations on a second image.

System 300 may comprise an optional image preprocessing part 310. Part 310 may be configured to prepare the images for registration if needed, and not already done before the images are received. For example, image preprocessing part 310 may crop the images, or isolate the relevant part, e.g., an image of a tissue may be isolated from an image of a slide. If multiple tissue slices are shown in an image, they may be converted to multiple separate images. Images may be normalized, converted to gray scale and the like. In an embodiment, a background image, e.g., an image of the slide without the tissue may be subtracted from the first image to improve matching.

The preprocessing part 310 may be configured to remove a non-tissue part of the image. For example, preprocessing part 310 may be configured to remove markings from the images, e.g., a marking from a pathologist, to remove company names, and the like. For example, preprocessing part 310 may be configured to exclude bubbles under a cover glass.

Image registration system 300 comprises a rotation searching unit 320, which may be configured for the angle phase. System 300 may comprise a rotation unit 322 configured for rotating an image, and a first matching unit 324 configured for estimating the alignment between two images.

For example, rotation searching unit 320 may be configured to iterate over multiple potential rotation angles. For example, this may comprise a loop over all integer angle between 0 and 359. The loop may include fewer angles, e.g., over multiples of 2, or 10 degrees. The loop may include more angles, e.g., over multiples of 0.5, or 0.1. In an embodiment, the number of potential different rotation angles considered in the angle phase is at least 100, at least 250, at least 360, at least 720, etc.

In an embodiment, searching for the angle can start from an approximation. For example, it is expected that the angle will be in a subrange, say, between +45 and −45 degrees. Accordingly, the loop may start with the subrange, and iterated over angles in the subrange, then if no sufficiently good alignment is found, say, alignment over a threshold value, then the subrange may be extended, e.g., to the full range.

In an embodiment, searching for the angle may be done in two phases, e.g., in a first phase, a coarse search for the angle is made, e.g., by iterating over a subset of the potential angles, e.g., using a first increment. Once the coarse search is complete, a second search can be done in a range near the angle found in the coarse search using a second, smaller, increment. For example, the coarse search may iterate over integer increments. Once an angle is found, say, x degrees, a second search may iterate over smaller increments, say, 0.1 degrees, in a smaller range, say from x−1 up to x+1.

For each particular potential angle that is to be tested, the fitness of the particular potential angle is determined. For example, given a potential rotation angle, one may rotate one of the images, say the first image over the potential rotation angle, e.g., using rotation unit 322. The rotated image and the non-rotated image are then compared for alignment, e.g., fitness, e.g., using the first matching unit 324. Determining the fitness can be done in a number of ways.

Interestingly, one could use phase correlation method to determine how well a particular angle performs. In effect, phase correlation is used to determine a best translation vector to go with a particular potential rotation angle. Note that the phase correlation algorithm is applied on untransformed images, that is, without performing the log-polar transform. Although phase-correlation does not work well to find the angle with the log-polar transform it was found to work well enough to compare the relative merits of different angles. Note that the phase correlation method conventionally provides a translation vector as well as an alignment score.

In an embodiment, the rotation angle is determined by iterating over multiple potential rotation angles, wherein an iteration for a potential rotation angle comprises rotating the first image over the potential rotation angle, and determining alignment between the rotated first image and the second image using the phase correlation method, and wherein neither the first image nor the second image are transformed to log-polar coordinates. In fact, apart from Fourier type transformation, e.g., the discrete Fourier transform (DFT) no other transforms are needed, e.g., no Radon transform, or the like.

For example, one may perform the phase correlation, e.g., perform a DFT of the two images (one rotated, one not), multiply them and perform an inverse DFT. Of the resulting 2d-array the maximum value is taken. This value is representative for alignment between the two images. The coordinate of this pixel is also indicative of a translation vector between the two images, though this may be left unused in embodiments.

The rotation of the first image can be done over any convenient center or axis, e.g., a center point of the image, a center of gravity, etc.

Figures 4A, 4B:
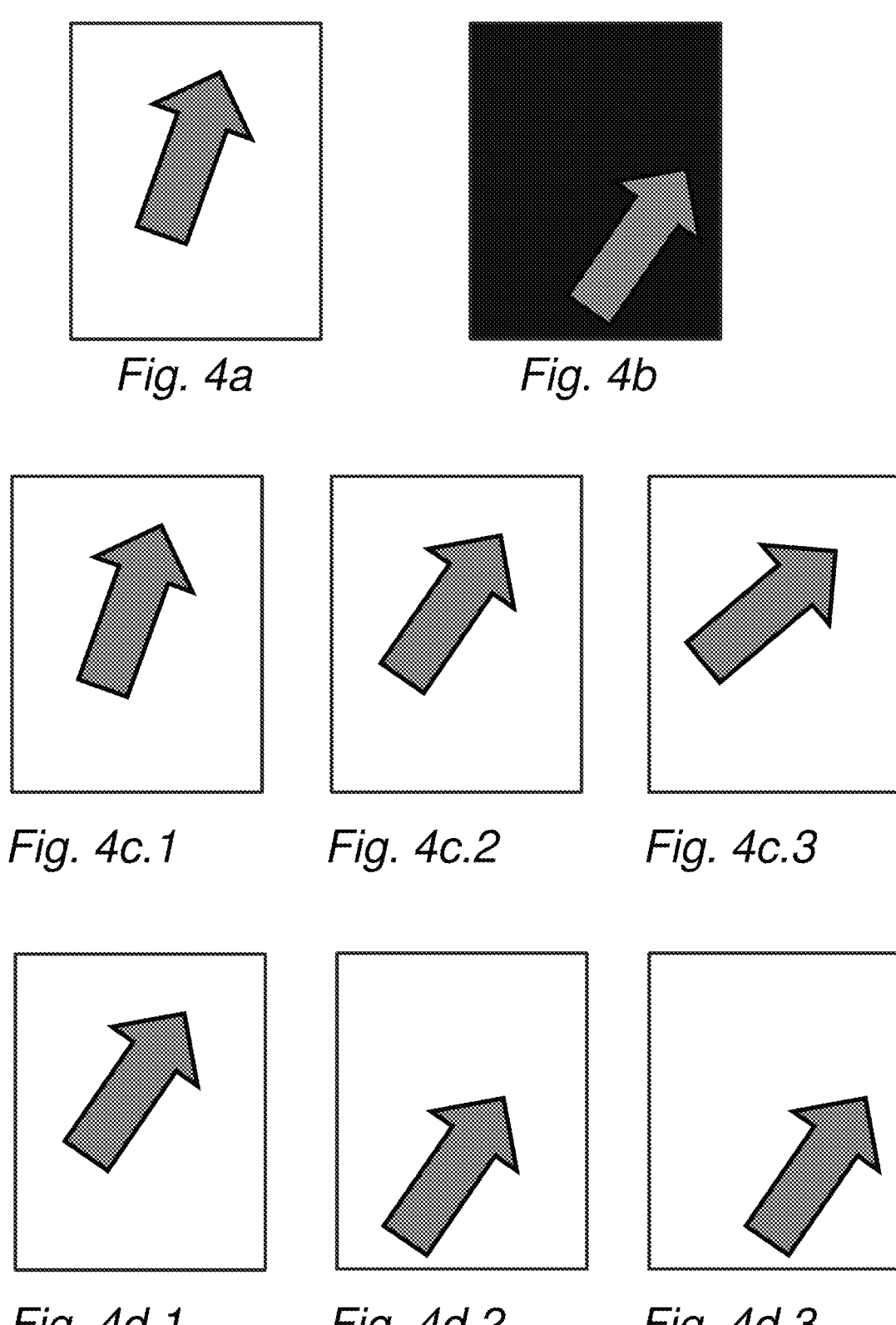

FIG. 4*a* shows an example of an embodiment of bright field image. FIG. 4*b* shows an example of an embodiment of dark field image. Note that, although the two pictures schematically represent a similar image (an arrow in this example), the two images have different lighting. Moreover, a rotation and translation have been applied. We will take FIG. 4*a* as the first image and FIG. 4*b* as the second image.

In the angle phase, the first image is rotated over a series of potential rotation angles. FIGS. 4*c*.1-4*c*.3 schematically show examples of an embodiment of a rotated bright field image. In this case, FIG. 4*c*.2 is rotated over the correct degree. When comparing FIGS. 4*c*.1 to 4*c*.3 for alignment with FIG. 4*b*, FIG. 4*c*.2 gives the best alignment, e.g., an alignment indicating best alignment, e.g., highest alignment score.

Note that, although the rotation is correct in FIG. 4*c*.2, the translation is not. For phase correlation this is not a problem as it will provide a translation vector as well. For other alignment algorithms, a translation vector can be approximated, e.g., by identifying a landmark in both images and measuring a displacement between the landmarks. One of the images can then be translated over the approximated translation vector and the alignment can be determined in any of the conventional methods therefore—examples are given below in the context for searching the translation vector, though they can also be applied here.

From all the rotated versions of the first image, the best one is selected, e.g., the one giving the highest score in alignment, e.g., after phase correlation.

System 300 comprises a translation searching unit 330 configured to determine a translation vector after rotation angle has been determined. For example, system 300 may comprise a translation unit 332, and a second matching unit 334. For example, the first image may be rotated over the selected rotation angle. Then a translation vector between the rotated and non-rotated image may be found. Instead of rotating the first image, one can rotate the second image instead.

In an embodiment, phase correlation may be used to calculate the translation vector. An advantage of this is that one does not need to iterate over translation vectors. In an embodiment, iteration is used to find the rotation angle using two down-sampled images, while phase correlation is used to find the translation vector, but without using down-sampled images. Alternatively, iteration is used for the translation phase instead of phase correlation. An advantage of the latter approach is that any alignment score can be used. For example, any alignment function configured to take two images as input and to output an alignment score indicating the fitness of the alignment. Such a function could be correlation, but could be any other alignment function.

Another approach is to iterate over multiple potential translation vectors, and to evaluate the alignment for each of the potential translation vectors. For example, in an embodiment, the rotated first image is translated over the potential translation vector, e.g., by translation unit 332, and the alignment between the translated, rotated first image and the second image is determined, e.g., by second matching unit 334. At this point the full translation is available (rotation+translation), which may be used to use a wider range of alignment measures. The alignment measure used, may be correlation, e.g., as also used to score rotation angles, but instead a different measure may be used, e.g., sum of squared difference between image features, e.g., gray scale values, edge orientation, etc.

FIGS. 4*d*.1-4*d*.3 schematically show examples of an embodiment of a translated and rotated bright field image. Recall that FIG. 4*c*.2 gave the highest alignment score based on the rotation angle. Applying the phase correlation algorithm to FIGS. 4*c*.2 and 4*b* can give the translation vector directly. Alternatively, in FIGS. 4*d*.1-4*d*.3 various potential translations are applied to FIG. 4*c*.2, or to FIG. 4*a* after rotating over the found rotation angle. Each of the FIGS. 4*d*.1-4*d*.3 can be compared to FIG. 4*b* to find the best match. In this example, FIG. 4*d*.3 provides the best match. For example, one may compute the correlation between the translated, rotated first images 4*d*.1-4*d*.3 and the second image 4*b* to determine their alignment. It is possible to rotate FIG. 4*b* instead of FIG. 4*a* before searching for a translation vector; for example, FIG. 4*b* and FIG. 4*a* may be rotated with respect to each other before searching for a translation vector.

System 300 may comprise an application unit configured to use the rotation angle and translation vector that have been found. For example, the application unit may be configured to receive a location in the first image 311, to apply the rotation angle and translation vector and to compute a location in second image 312. For example, application unit 340 may be configured to direct a treatment tip to the transferred location and to apply treatment to a tissue at a location indicated by the transferred location in the second image. The registration could be extended by searching for a scaling factor. For exampling, in the angle phase one may iterate over combinations of a scale factor and a rotation. A combination of scale and rotation can be tested for alignment using phase correlation. This also does not need the log-polar transform. For example, a scale factor between 95% and 105%, in steps of 1% may be applied. Although this adds (in this example) a factor of 10 to the workload, even a small correction in scale can improve the alignment.

Scaling may be taken into account for some types of staining. For example, it has been observed with H&E stainings that the tissue may shrink to some extent. This can be countered by applying an amount of scaling to two images to bring them back to the same scale. For example, the amount of scaling may be fixed, or may be predetermined based on tissue type and scaling type. For example, the amount of scaling may be obtained from a function, a look-up table. A user may set the scaling amount. Bringing two images to the same scale can be done by enlarging the smaller image or shrinking the larger one, or by doing both to a lesser extent. In an embodiment, scale and rotation are tested together, e.g., as indicated above. The amount of scale may be searched around an expected scale factor, e.g., as obtained from tissue type and/or staining type.

Figure 5A:
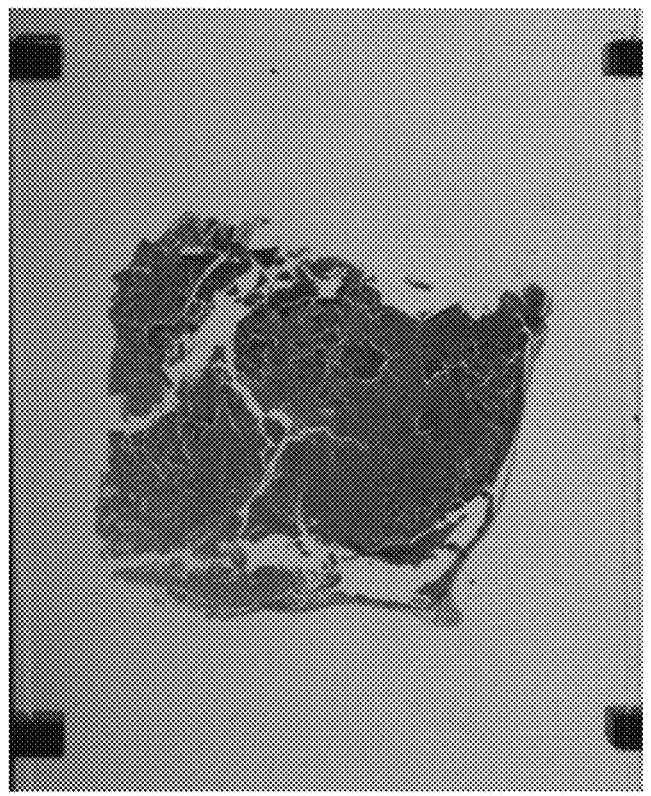
FIG. 5a shows an example of an embodiment of bright field image.
Figure 5B:
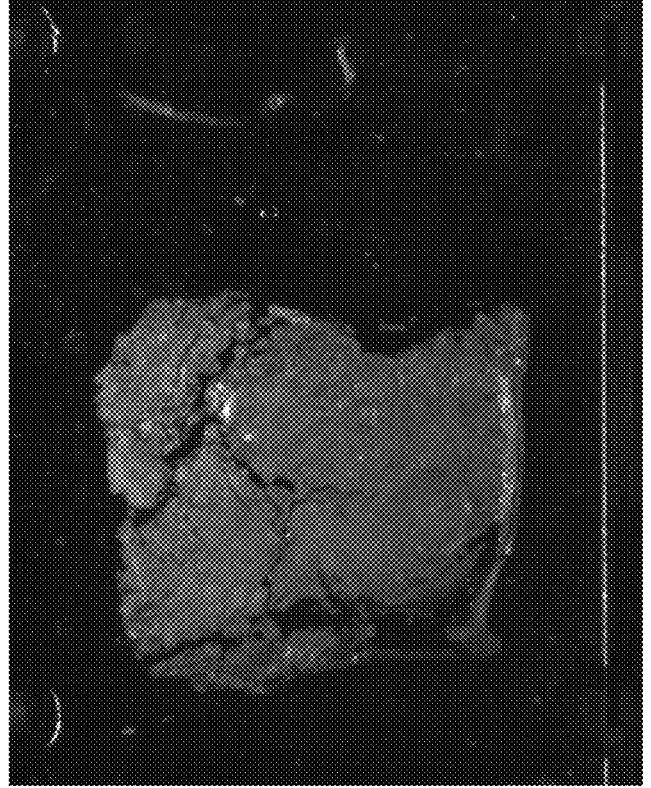
FIG. 5b shows an example of an embodiment of dark field image.
Figure 5C:
FIG. 5c shows an example of an embodiment of a registered bright field image superimposed on a dark field image, FIG. 6a schematically shows an example of an embodiment of a bright field image, FIG. 6b schematically shows an example of an embodiment of a dark field image, FIG. 6c schematically shows an example of an embodiment of a bright field image, FIG. 6d.1 schematically shows an example of an embodiment of a dark field image, FIG. 6d.2 schematically shows an example of an embodiment of a dark field image, FIG. 6e schematically shows an example of an embodiment of a dark field image, FIG. 6f.1 schematically shows an example of an embodiment of a dark field image, FIG. 6f.2 schematically shows an example of an embodiment of a dark field image, FIG. 6g schematically shows an example of an embodiment of a dark field image, FIG. 7a schematically shows an example of an embodiment of an image registration method, FIG. 7b schematically shows an example of an embodiment of a tissue treatment method, FIG. 8a schematically shows a computer readable medium having a writable part comprising a computer program according to an embodiment, FIG. 8b schematically shows a representation of a processor system according to an embodiment.

FIG. 5*a* shows an example of an embodiment of bright field image. FIG. 5*b* shows an example of an embodiment of dark field image. Note that in this reproduction FIG. 5*a* is a gray scale image; however the original is a color image of a stained tissue. The tissue in FIG. 5*b* is unstained. Taking the image of FIG. 5*a* as the first image and the image of FIG. 5*b* as the second image, an embodiment computes the following transformation: a rotation of 22 degrees, x-translation: 8 px and y-translation: 85 px. The match of the rotated and translated first image and the second image was computed as 80.49%. FIG. 5*c* the registered bright field image of FIG. 5*a* superimposed on the dark field image of FIG. 5*b*, showing their near perfect alignment.

In this example, the correlation coefficient is used as the match factor between two images, that is the two images have a correlation coefficient of 0.8049 after rotation and translation using normalized cross correlation.

Returning to FIG. 3. Various optional refinements to the process described herein are possible. The images may first be converted to gray scale. Furthermore, for example, before registering the two images, they may be normalized. Normalizing an image may comprise computing an average of its values, and subtracting said value from the pixel values. This causes the new average to become zero. Further normalization may comprise computing the standard deviation and dividing the pixel values by the standard deviation, this causes the new standard deviation to be 1. Normalization is preferably done before using phase correlation. Normalization may be done by pre-processing unit 310. Normalized images perform better in the Fourier transform and phase correlation.

In an embodiment, the images are down-sampled. This speeds up the process, as there are fewer pixels to consider. In an embodiment, down-sampling is done for the angle phase, but not for the translation phase. Especially if phase correlation is used for the translation phase, then relatively less gain is made by down-sampling, at the expense of losing accuracy.

In an embodiment, rotating in the angle phase and/or translating in the translation phase may use subpixel interpolation.

The process of finding the angle or translation vector can be repeated, once a first approximating has been found on down-sampled images. For example, on the non-down-sampled images, the search can be restricted to angles or vectors in a range around the angle and vector found for the downsampled images. For example, both dimensions of the first and second images may each be reduced to between 10% and 50% of their original size.

In an embodiment, the angle phase produces a single best angle, however this is not necessary. For example, one could also proceed to the translation phase with multiple angles. For example, the best k angles having the best alignments. For example, a range around the best angle. For each of these angles the best translation vector can be found.

In an embodiment, other types of pre-processing may be used. For example, in an embodiment, the preprocessing the first image and/or the second image by background subtraction, and/or edge detection.

For example, for background subtraction, an image is taken with the same camera at the same location with a slide without tissue on it. The background is typically taken before taking the images that are to be aligned. For example, one may take the background image as part of calibration of the device, e.g., when the device us set-up. A background image may be taken under the same lighting conditions as the image from which it is to be subtracted. Subtracting a background image from one or both of the images that are to be aligned reduces unwanted signal from parts that are not relevant for the alignment.

One could use background subtraction for both images, but this is not needed. In fact, in an embodiment a darkfield and brightfield image is used, but background subtraction is only used for the brightfield image. The background subtraction improves contrast, which is beneficial for the brightfield image. For the darkfield image, contrast is not problematic, because the tissues are clearly visible.

Edge detection is a preprocessing technique which takes and image as input and produces an edge-detected image as output. For example, one may use the Canny edge detector algorithm. In an embodiment, an edge detection algorithm is applied to the first and second image before registration. Before performing edge detection a blurring algorithm may be applied to smooth the images, e.g., one may use the Gaussian blur algorithm. For example, a pre-processing stage may comprise, subtracting a first background image from the first image and/or a second background image from the second image, applying a blurring algorithm and applying an edge detection algorithm. Finally, an embodiment of the registration may be applied to the pre-processed images.

FIGS. 4*e*.1 and 4*e*.2 schematically show examples of an embodiment of an exclusion area in a bright field and dark field image. The exclusion area is indicated with a dashed line. In this case, an exclusion area is indicated for both the first and the second image, though typically, only one of the two images might have one.

In an embodiment, exclusion areas can be defined, e.g., by a user through a user interface, or by an algorithm, e.g., a machine learning algorithm. When computing alignment scores, the exclusion areas are not taken into account. For example, the exclusion area can be cropped off, or filled with background color, e.g., white, black, the average image color, etc. The use of exclusion area is especially useful when registering tissue images. It can happen, that a tissue slice is not applied to a slide correctly and that one of the corners of the slice is folded over. These are known as so-called dog-ears. If one of the images that are to be aligned has a dog-ear and the other does not, or at a different place, then this may reduce the accuracy of the alignment. The dog-eared portion should not match any part of the other image, and thus can only introduce noise. By ignoring the dog-eared portion the accuracy is increased.

For example, in the translation phase, an alignment score may be computed by skipping over the part in the image having the exclusion phase. For example, an alignment score function may be applied to all parts of the first and/or second image, but skipping over any part of the first and/or second image that lies in an exclusion part. The exclusion parts may be transferred from the original first image to a transformed first image, in order to compute the alignment, while skipping over the exclusion part.

For example, exclusion parts can be handles in pre-processing, e.g., by filling in the part with a background color, or cropping the image. Although the use of exclusion areas can improve matching, for most images, it is not necessary, as the algorithm is capable of finding correct registration even in the presence of distractions. Exclusion areas can also be used to exclude bubbles under the cover glass. It can happen that a cover glass is put on incorrectly trapping a bubble under it. Such a bubble is visible in the image but should not be taken into account for the matching as the other image does not have a bubble at the corresponding place. Exclusion areas can also be used to exclude manufacturer logo or pathologist markings. Without exclusion areas, the algorithms will generally arrive at a correct registration, albeit with a lower matching score. If distractions, such as dog-ears, logos and the like happen to be in an unfavorable location they can cause an incorrect registration in some unlucky cases. The prevalence of such situations can be removed using exclusion areas. The part to exclude can be indicated manually, e.g., by an operator of the device, they can also be obtained automatically, e.g., using image recognition algorithms. For example, logos, dog ears, bubbles and the like can be recognized by an image recognition algorithm, e.g., trained on such images and excluded automatically, possibly asking for user confirmation that the found exclusion area is correct.

Below is an example of an embodiment of an image registration algorithm to align a darkfield, unstained image, (the 'unstained image') and a white field, stained, reference image (the 'reference image'). The algorithm comprises the following steps:

1. Subtract a background image from the white field image. Downsample both images to 20% of their original size (that is height and width are each 20% of the original).
2. Convert the image values to floating point, and normalize to mean 0, std 1
3. Apply the 2D Discrete Fourier Transform (DFT) to the unstained image. Output are two channels, a real and imaginary channel. For example, the two channels may be combined in a complex valued matrix.
4. Angle Estimator
   a. Determine the center of gravity of reference image
   b. Loop over angles from 0 to 360
      i. Rotate the reference image over the angle around the center
      ii. Compute DFT of the rotated reference image
      iii. Multiply the DFT of both unstained and the rotated reference images, e.g., as a complex matrix multiplication.
      iv. Then perform inverse DFT on the multiplied array
      v. Obtain the largest value of the inverse DFT array, and record it for the angle
   c. The best angle is the one that gave the largest value for step v.
5. Add a border around the reference image and rotate the reference image by the computed angle of step 4.
6. Shift Estimator
   a. Find the best x,y by looping over all x,y shifts; shift one of the two images and compute the correlation. Highest correlation gives the best shift.
7. Output angle and x,y shift
8. Optionally, apply angle and x,y shift to a location in the reference image to obtain a location in the unstained image.

In an embodiment, steps 5-8 are skipped, and replaced by a phase correlation algorithm to determine the translation vector.

Below is a second example
1. Read the first image and second image in two variables each supporting 2 dimensions and three color channels
2. Read a background channel and subtract it from the first image
3. Convert the first and second image to gray scale, leaving only a single channel.
4. Crop the images if needed to remove unwanted parts; e.g., parts showing a slide, or the like.
5. Downsample both images to 20%. (both dimensions are 20% of the original size.) This may use interpolation.
6. Convert the downscaled images to floating point variables.
7. Normalize the images (to mean zero, std one)
8. Add a channel filled with zero's to each image
9. Apply DFT to the second image
10. Compute the center of gravity of the first image 11. Loop over all integer angles from 0 to 359
   a. Rotate the first image over an angle using the center of gravity
   b. Compute the DFT of the rotated image
   c. Compute the multiplication of the DFT spectra of rotated first image and of the unrotated second image, and apply IDFT
   d. Find the maximum value in the resulting 2d image, and record this maximum for the angle.
12. When looping is finished, the angle which gave the maximum value in step 15, is the best angle for alignment.
13. Compute the center of gravity for the original high resolution first image, and rotate it over the best angle using its center of gravity.
14. Add a border of zeros around the original second image
15. Loop over all translation vectors, translate the first image and compute an alignment score, e.g., by applying an alignment function.

The alignment function may be correlation, but other choices are possible. For example, the alignment score may be normalized correlation, e.g.

$$\frac{\sum A(x, y)B(x + x')B(x + x', y + y')}{\sqrt{\sum A(x, y)^2 \sum B(x, y)^2}},$$

in which A is the first image, and B the second image, and x' and y' are the coefficients of the translation vector. Other alignment scores can be substituted. For example, an alignment score may be limited or weighted to edge-detected parts of the images.

FIG. 6a schematically shows an example of an embodiment of a bright field image. FIG. 6b schematically shows an example of an embodiment of a dark field image. The image of FIG. 6a may be a stained tissue image, while FIG. 6b may show an unstained tissue, ready for treatment. For example, the images of FIGS. 6a and 6b may be shown on a user interface, e.g., side by side. For example, only the image of FIG. 6a may be shown on a user interface. For example, none of these images may be shown on a user interface, and locations may be selected by an algorithm.

FIG. 6a shows a location 610 on a first image. For example, location 610 looks clinically relevant. In an embodiment, the first and second image are registered with each other, and the transformation is used to transfer location 610 from the first image to the second image. The transferred location 611 is shown in FIG. 6b as a small circle. It may be easier to identify a relevant location in the first image, e.g., due to different lighting and/or staining, but the tissue shown in FIG. 6b is more suitable for detachment, e.g., due to a lack of staining, and/or for automated steering of the treatment arm and tip. The unstained tissue can be seen much better on the dark field image, so that dark field is preferred for detachment. Note that stained images are not visible at all in dark field due to their cover glass.

A user of a treatment system may be shown FIG. 6a in which one more locations can be defined by the user, or in which the user can confirm one or more locations defined by an image recognition algorithm. The defined locations are then transferred to FIG. 6b. FIG. 6b may also be shown to the user, after which the user can confirm the transfer. Alternatively, or in addition, the user can confirm the registration, for example, the user may be shown the two images super imposed on each other.

In an embodiment, FIG. 6*b* and transferred location 621 is shown in a user interface, e.g., on a display. For example, user interface may be configured to receive from the user a confirmation. For example, user interface may be configured to receive from the user a correction to the transferred location. For example, a user may move, e.g., nudge, a transferred location to a better position based on the second image. Although such correction is not typically needed, even with such user based correction, the transferring of location is still much less labor intensive using automated transfer of location instead of fully manual transfer of locations.

The treatment system can then proceed to treat the tissue at the location, e.g., detach tissue from the location.

In an embodiment, asking for confirmation by the user is dependent on the quality of the registration. For example, a registration device may compute an alignment score. The alignment score, may be, e.g., a correlation between the two images after alignment, or a summed squared difference, etc. In an embodiment, not asking for a confirmation is the default, but, if the determined alignment, e.g., the alignment score, is lower than a first threshold, then, the user is asked for confirmation, e.g., on the transferred location in the second image. In an embodiment, asking for a confirmation is the default, but if the determined alignment is higher than a second threshold, then the user is not asked for confirmation. For example, a user may be shown a transformed first image super imposed on a second image, e.g., as in FIG. 5*c*, to illustrate the alignment.

For example, the location may be in a so-called region of interest or area of interest, and indicate a location where tissue is to be detached, e.g., lysed, scraped or lasered.

FIG. 6*c* schematically shows an example of an embodiment of a bright field image in which an area of interest 620 is indicated with a dashed line. Inside the area of interest, multiple locations are defined, in this example, two locations. Using multiple locations is useful, e.g., if a location based detachment is used, e.g., lysing. When using lysing, a pipetting tip is steered towards the defined locations, and tissue is detached across an area indicated by the size of the pipetting tip. In this example, two different sized pipetting tips are used which together fill most of the area of interest.

For example, in an embodiment, the multiple locations may each be transferred from the first image to the second image, e.g., for lysing at the multiple transferred locations.

In an embodiment, the area of interest is defined by a contour on the first image. The contour may be transferred to the second image and its interior can then be detached. For example, this may be done using scraping. For example, an algorithm may determine locations in the area for lysing, e.g., using a packing algorithm.

FIG. 6*d*.1 schematically shows an example of an embodiment of a dark field image in which multiple locations have been transferred from the first image, in this case from FIG. 6*c*.

One location, transferred location 621, is labelled with a reference numeral. For example, in an embodiment, a user may define the area 620. Inside area 620, one or more locations are defined. The locations are then transferred to the second image in FIG. 6*d*.1, and used for tissue treatment.

FIG. 6*d*.2 schematically shows an example of an embodiment of a dark field image in which an area has been transferred from the first image, in this case from FIG. 6*c*. The transferred area is indicated with reference numeral 622. For example, in an embodiment, a user may define the area

620. Area 620 is transferred to the second image in FIG. 6*d*.2. In this case areas 620 and 622 are locations that indicate where tissue treatment is to take place.

For example, location transferring as in FIG. 6*d*.1 is well suited for lysing tissue detachment, in which tissue detachment is limited by the shape of the pipetting tip. For example, location transferring as in FIG. 6*d*.2 is well suited for scraping tissue detachment, in which tissue detachment is not limited by the shape of the pipetting tip. Either type of transferring is not limited to a particular type of tissue treatment.

In an embodiment, a first image, e.g., a bright field image of a stained tissue, may have been provided with markings. For example, a user may use a marker, either a physical marker or a virtual one, to indicate on the first image, which areas of the tissue are of interest. A registration system may comprise an image recognition algorithm to recognize such writing, and then to determine one or more locations in the marked area.

For example, in a workflow, a tissue sample, e.g., a biopsy, may be sliced into multiple tissues slices. The slices are applied on slides. The tissue section on one slide is stained, and a user marks the tissue slice with a physical marker to indicate regions of interest. The slides, including the stained, and the unstained slices are then loaded in a tissue treatment device for imaging. The stained slice is lighted with bright field lighting, obtaining a first image, while the other slices are lighted with dark field lighting, obtaining one or more second images. The marking on the first image is identified, and corresponding locations are defined, e.g., by an image recognition algorithm. The defined locations are then transferred to the second images, using image registration as in an embodiment. Tissue treatment can now commence. Instead of physically marking the tissue slice with a physical marker, also virtual marking with a virtual marker on an image of said slice is possible.

For example, a user, e.g., a medical practitioner, may indicate on a first image, e.g., an image such as FIG. 6*c*, the area of interest, e.g., area 620. For example, this may be done digitally, in which case the contours can directly be used to define locations therein and/or for transferring to the second image. Defining locations may be done in the first image, after which the defined location(s) may be transferred or in the second image, in a transferred area of interest. Marking may also be done physically, e.g., with a physical marker, e.g., a felt-tip marker. Such markings are easily recognized, as the image of such marking is quite different from tissue image. In an embodiment, a colored marker is used, and said color is recognized to recognize the marking. For example, green was found to be a suitable color. In an embodiment, a user's marking is detected on the first image which indicates a location.

In an embodiment, the first image and/or second image may be of insufficient quality to enable correct alignment and transferring of locations. As alignment is usually quite good, a bad alignment is an indicator of problems. In an embodiment, a registration system is configured to determine a quality indicator from at least the determined alignment, e.g., low alignment indicates low quality images. Other factors may contribute to the quality indicator. For example, an image recognition algorithm may be trained to recognize tissue images. If the tissue is not recognizable, this indicates a bad image.

If the quality indicator indicates a low quality, e.g., is below a threshold, then a registration system may enable the taking of new images, e.g., with different imaging parameters. For example, if the quality indicator is bad, one could take images with different shutter times or different illumination, e.g., to shift saturation, and increase contrast for difficult tissues.

Figure 6E:
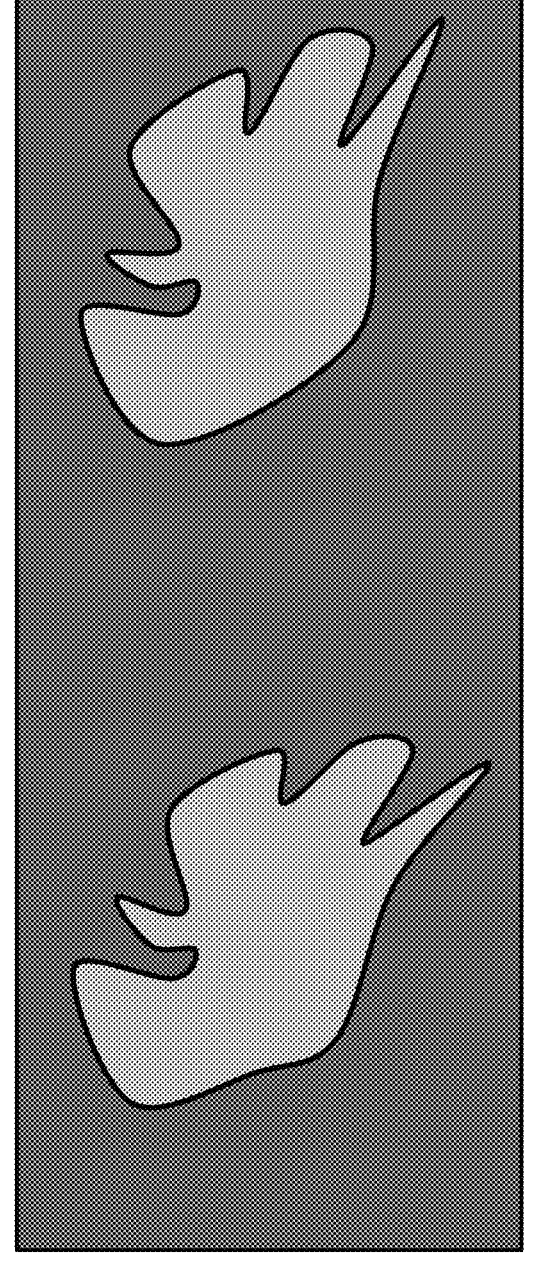
Figure 6E:
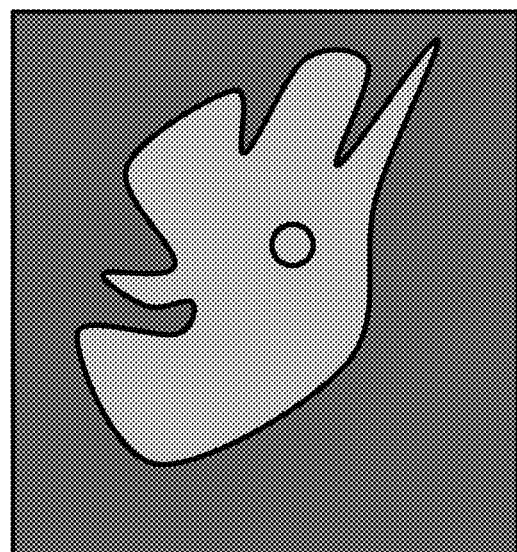
Figure 6E:
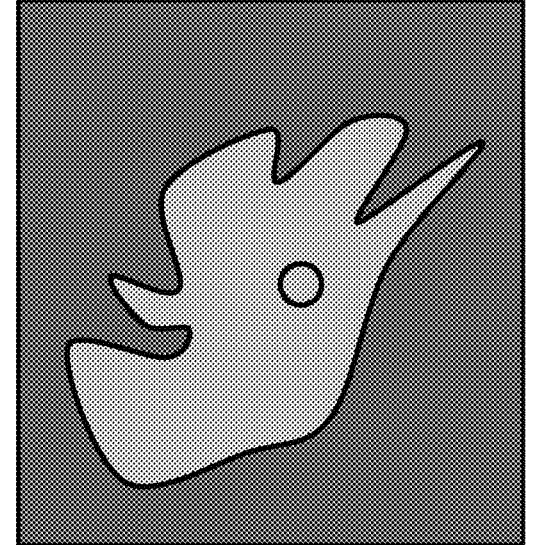

FIG. 6e schematically shows an example of an embodiment of a dark field image.

In an embodiment, multiple second images may be provided. For example, the first image may be an image of a first tissue slice. The multiple second images may be images of a series of second tissue slices. For example, the first tissue slice and the multiple second tissue slices may all be slices of the same tissue. The slices may be provided to a camera while applied to a slide. In an embodiment, the first image is registered to each of the second images, and the locations on the first image are converted, e.g., transferred, to each of the second images.

For example, in the case of FIG. 6e, which shows two second tissue slices, the location on FIG. 6a is transferred to locations on the two slices shown in FIG. 6e. Note that the first tissue slice and the second slices have a very similar shape, and in practice will also show similar structural elements, and similar textures at corresponding places. They need not be identical, however. For example, the lower tissue slice in FIG. 6e is very similar in shape to the tissue in FIG. 6a and the upper tissue slice in FIG. 6e; it is however not identical. This means that alignment would give a better match, and a higher alignment score, for the upper part of FIG. 6e, though still the alignment made for the lower slice of FIG. 6e would still be good.

One could have a different slide for each slice, but multiple slices may be applied to one slide. FIG. 6e shows two second slices applied to the same slide. This can be dealt with in a number of ways.

For example, the image of the slide shown in FIG. 6e can be automatically portioned into multiple separate second images. This is shown in FIGS. 6f.1 and 6f.2 in which the tissue slices are isolated, and location 611 is transferred. For example, a straightforward cropping would suffice in a simpler embodiment. A more advanced embodiment may employ image recognition to locate the slices on the slide.

Figure 6G:
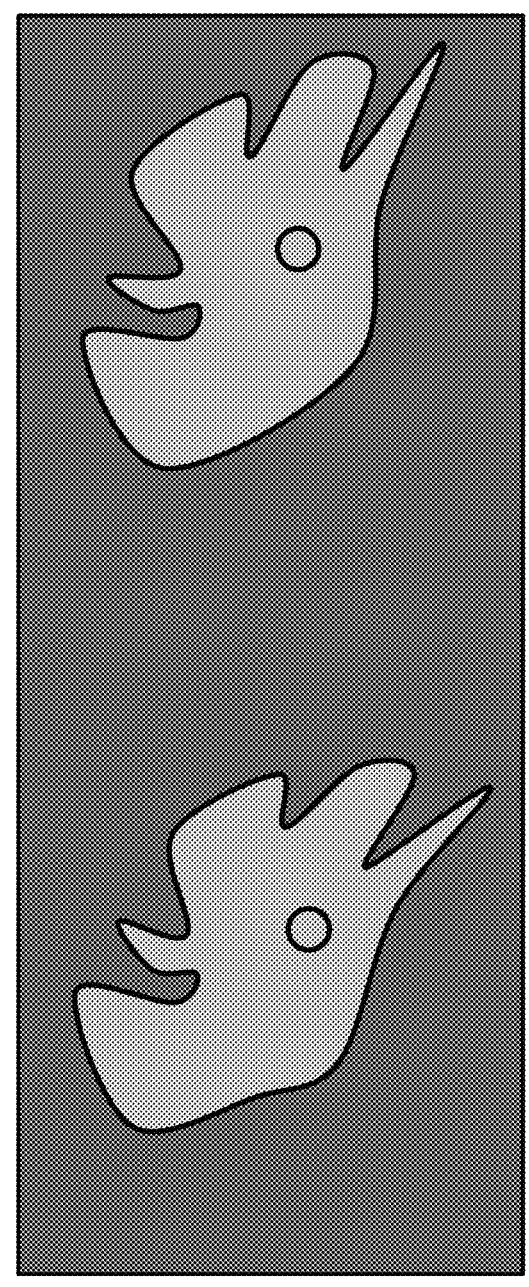

Another approach is to perform the registration more than once. For example, in case of FIG. 6e, perform registration twice, once to the upper slice, e.g., upper part, of FIG. 6e, and once to the lower. This approach was taken in FIG. 6g. FIG. 6g shows that defined location 610 has been transferred twice to FIG. 6g.

In an embodiment, multiple sub-images are identified in the second image, the first image being registered to each of the multiple sub-images. One or more defined locations in the first image may be transferred to each of the multiple sub-images. In an embodiment, the multiple sub-images each represent a tissue slice. Tissue treatment may be performed at locations corresponding to the transferred locations in the multiple tissue slices.

In the various embodiments of systems and/or devices 140, 200, 201, 210, 260, 300 and 350, the communication interfaces may be selected from various alternatives. For example, the interface may be a network interface to a local or wide area network, e.g., the Internet, a storage interface to an internal or external data storage, an application interface (API), etc.

They may have a user interface, which may include well-known elements such as one or more buttons, a keyboard, display, touch screen, etc. The user interface may be arranged for accommodating user interaction for configuring the systems. User interaction may comprise one or more of: define one or more defined locations, confirm suggested defined locations, start treatment, e.g., start lysing, etc.

Storage may be implemented as an electronic memory, say a flash memory, or magnetic memory, say hard disk or the like. Storage may comprise multiple discrete memories together making up the storage, e.g., storage 240, 280. Storage may comprise a temporary memory, say a RAM. The storage may be cloud storage.

The systems may be implemented in a single device. Typically, the systems and devices each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 7A:
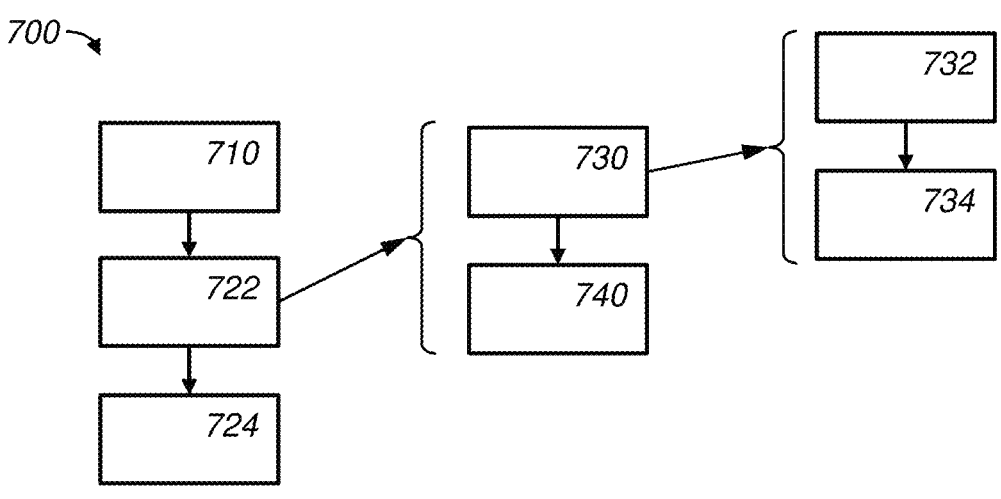

FIG. 7a schematically shows an example of an embodiment of an image registration method 700 suitable for computer implementation. Method 700 comprises obtaining (710) a first image and a second image, and determining a rotation angle (722) and subsequently determining a translation vector (724), the rotation angle and translation vector together defining an alignment transformation between the first image and the second image, wherein determining the rotation angle comprises iterating (730) over multiple potential rotation angles, wherein an iteration for a potential rotation angle comprises rotating (732) the first image over the potential rotation angle, and determining (734) alignment between the rotated first image and the second image, and selecting (740) the rotation angle with best alignment.

Figure 7B:
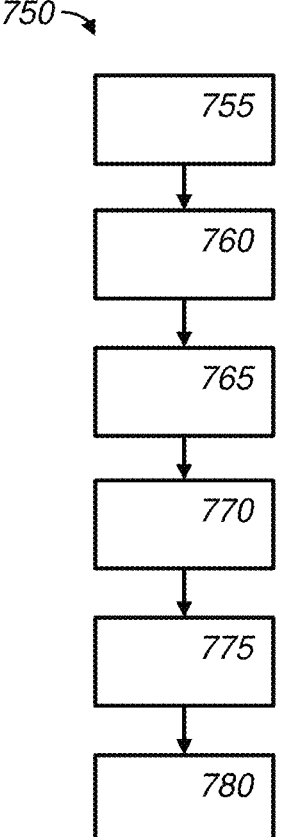

FIG. 7b schematically shows an example of an embodiment of a tissue treatment method 750. Method 750 comprises receiving (755) a first tissue slice and a second tissue slice. For example, the first tissue slice may be stained, the second tissue slice may be unstained.

imaging (760) the first tissue slice and imaging the second tissue slice, obtaining a first image and a second image. For example, the first image may be bright field lighted, and the second image may be dark field lighted.

obtaining (765) a first location on the first image. For example, the first location may be user defined, or determined automatically.

registering (770) the first image and the second image according to an embodiment, transferring (775) the first location on the first image to a second location on the second image according to the image registration, chemically or physically treating (780) the second
tissue slice at the second location using a motorized
pipetting tip.

The tissue treatment may comprise extracting biomol-
ecules from the tissue material, such as one or more of
nucleic acids, proteins, lipids, and hormones. For example,
the method may detach part or all of the tissue local to the
second location. To access the tissue at the second location,
there may be a mapping from the second image to steering
command for a tissue treatment apparatus, e.g., a treatment
arm and/or tip. For example, the second image may be
calibrated to movement of the treatment tip.

Typically, the first slice and second slice are each received
on a separate slide.

Many different ways of executing the method are pos-
sible, as will be apparent to a person skilled in the art. For
example, the order of the steps can be performed in the
shown order, but the order of the steps can be varied or some
steps may be executed in parallel. Moreover, in between
steps other method steps may be inserted. The inserted steps
may represent refinements of the method such as described
herein, or may be unrelated to the method. For example,
some steps may be executed, at least partially, in parallel.
Moreover, a given step may not have finished completely
before a next step is started.

Embodiments of the method may be executed using
software, which comprises instructions for causing a pro-
cessor system to perform method 900 and/or 950. Software
may only include those steps taken by a particular sub-entity
of the system. The software may be stored in a suitable
storage medium, such as a hard disk, a floppy, a memory, an
optical disc, etc. The software may be sent as a signal along
a wire, or wireless, or using a data network, e.g., the Internet.
The software may be made available for download and/or
for remote usage on a server. Embodiments of the method
may be executed using a bitstream arranged to configure
programmable logic, e.g., a field-programmable gate array
(FPGA), to perform the method.

It will be appreciated that the presently disclosed subject
matter also extends to computer programs, particularly com-
puter programs on or in a carrier, adapted for putting the
presently disclosed subject matter into practice. The pro-
gram may be in the form of source code, object code, a code
intermediate source, and object code such as partially com-
piled form, or in any other form suitable for use in the
implementation of an embodiment of the method. An
embodiment relating to a computer program product com-
prises computer executable instructions corresponding to
each of the processing steps of at least one of the methods
set forth. These instructions may be subdivided into sub-
routines and/or be stored in one or more files that may be
linked statically or dynamically. Another embodiment relat-
ing to a computer program product comprises computer
executable instructions corresponding to each of the devices,
units and/or parts of at least one of the systems and/or
products set forth.

Figure 8A:
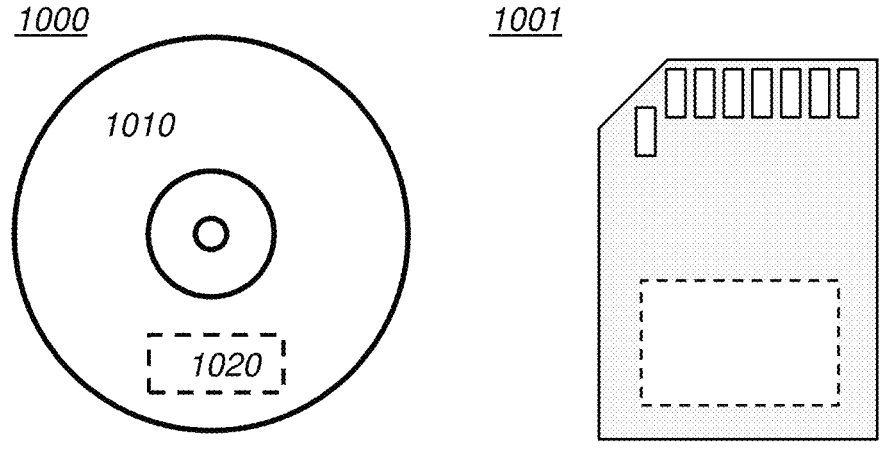

FIG. 8a shows a computer readable medium 1000 having
a writable part 1010, and a computer readable medium 1001
also having a writable part. Computer readable medium
1000 is shown in the form of an optically readable medium.
Computer readable medium 1001 is shown in the form of an
electronic memory, in this case a memory card. Computer
readable medium 1000 and 1001 may store data 1020
wherein the data may indicate instructions, which when
executed by a processor system, cause a processor system to
perform an embodiment of a tissue treatment method and/or
registering method, according to an embodiment. The computer program 1020 may be embodied on the computer
readable medium 1000 as physical marks or by magnetiza-
tion of the computer readable medium 1000. However, any
other suitable embodiment is conceivable as well. Further-
more, it will be appreciated that, although the computer
readable medium 1000 is shown here as an optical disc, the
computer readable medium 1000 may be any suitable com-
puter readable medium, such as a hard disk, solid state
memory, flash memory, etc., and may be non-recordable or
recordable. The computer program 1020 comprises instruc-
tions for causing a processor system to perform said tissue
treatment method and/or registering method.

Figure 8B:
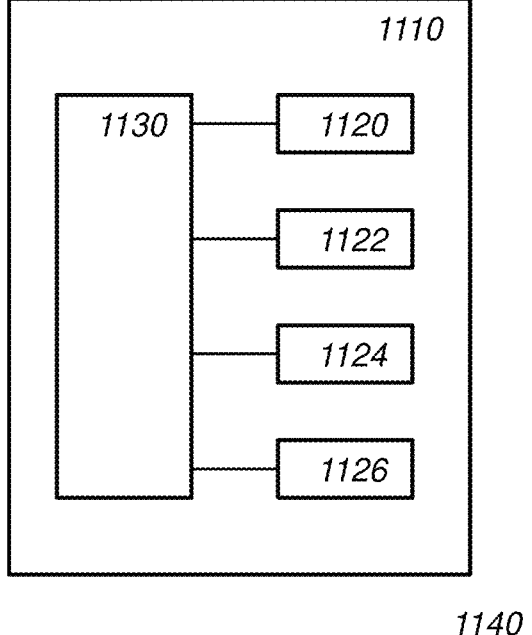

FIG. 8b shows in a schematic representation of a proces-
sor system 1140 according to an embodiment of a treatment
device and/or an embodiment of a registration device. The
processor system comprises one or more integrated circuits
1110. The architecture of the one or more integrated circuits
1110 is schematically shown in FIG. 8b. Circuit 1110
comprises a processing unit 1120, e.g., a CPU, for running
computer program components to execute a method accord-
ing to an embodiment and/or implement its modules or units.
Circuit 1110 comprises a memory 1122 for storing program-
ming code, data, etc. Part of memory 1122 may be read-only.
Circuit 1110 may comprise a communication element 1126,
e.g., an antenna, connectors or both, and the like. Circuit
1110 may comprise a dedicated integrated circuit 1124 for
performing part or all of the processing defined in the
method. Processor 1120, memory 1122, dedicated IC 1124
and communication element 1126 may be connected to each
other via an interconnect 1130, say a bus. The processor
system 1110 may be arranged for contact and/or contact-less
communication, using an antenna and/or connectors, respec-
tively.

For example, in an embodiment, processor system 1140,
e.g., a registering device or tissue treatment device may
comprise a processor circuit and a memory circuit, the
processor being arranged to execute software stored in the
memory circuit. For example, the processor circuit may be
an Intel Core i7 processor, ARM Cortex-R8, etc. The
memory circuit may be an ROM circuit, or a non-volatile
memory, e.g., a flash memory. The memory circuit may be
a volatile memory, e.g., an SRAM memory. In the latter
case, the device may comprise a non-volatile software
interface, e.g., a hard drive, a network interface, etc.,
arranged for providing the software.

While device 1140 is shown as including one of each
described component, the various components may be dupli-
cated in various embodiments. For example, the processor
may include multiple microprocessors that are configured to
independently execute the methods described herein or are
configured to perform steps or subroutines of the methods
described herein such that the multiple processors cooperate
to achieve the functionality described herein.

Further, where the device 1140 is implemented in a cloud
computing system, the various hardware components may
belong to separate physical systems. For example, the pro-
cessor may include a first processor in a first server and a
second processor in a second server.

The following numbered clauses include examples that
are contemplated and non-limiting:

Clause 1. A computer-implemented image registration
method, the method comprising obtaining (710) a first image and a second image, and determining a rotation angle (722) and subsequently
determining a translation vector (724), the rotation angle and translation vector together defining an alignment transformation between the first image and the second image, wherein determining the rotation angle comprises iterating (730) over multiple potential rotation angles, wherein an iteration for a potential rotation angle comprises rotating (732) the first image over the potential rotation angle, and determining (734) alignment between the rotated first image and the second image, and selecting (740) the rotation angle with best alignment.

Clause 2. An image registration method as in Clause 1, wherein the first image is a bright field image and the second image is a dark field image, or vice versa, and/or the first image is a stained tissue image and the second image is an unstained tissue image, or vice versa.

Clause 3. An image registration method as in any one of the preceding clauses, wherein alignment between the rotated first image and the second image is determined using phase correlation.

Clause 4. An image registration method as Clause 3, comprising computing the discrete Fourier transform of the rotated first image and of the second image, multiplying said discrete Fourier transforms, and computing the inverse discrete Fourier transform of said multiplication, selecting the largest value in said inverse discrete Fourier transform as a measure for alignment.

Clause 5. An image registration method as in any one of the preceding clauses comprising rotating the first image over the selected rotation angle, and wherein the subsequent determining of the translation vector comprises iterating over multiple potential translation vectors, wherein an iteration for a potential translation vector comprises translating the rotated first image over the potential translation vector, and determining alignment between the translated, rotated first image and the second image, selecting the translation vector with best alignment.

Clause 6. An image registration method as in Clause 5, comprising computing the correlation between the translated, rotated first image and the second image to determine their alignment.

Clause 7. An image registration method as in any one of the preceding clauses, wherein the first image and second image are images of different slices of the same tissue sample.

Clause 8. An image registration method as in any one of the preceding clauses, comprising obtaining a first exclusion area in the first image and/or a second exclusion area in the second image, disregarding the first and/or second exclusion area when determining alignment.

Clause 9. An image registration method as in any one of the preceding clauses, wherein the first and second image are downsampled before determining the rotation angle.

Clause 10. An image registration method as in Clause 9, wherein rotating or translating the first image comprises subpixel interpolation, and/or repeating the determining of the rotation angle and/or of the translation angle without said down-sizing.

Clause 11. An image registration method as in any one of the preceding clauses, identifying a tissue slice from multiple tissue slices in the first and/or second image, and cropping the image to the identified tissue slice.

Clause 12. An image registration method as in any one of the preceding clauses, comprising determining a quality indicator from at least the determined alignment, if the quality indicator is below a threshold, enable taking new images with different imaging parameters.

Clause 13. An image registration method as in any one of the preceding clauses, comprising preprocessing the first image and/or the second image by background subtraction, and/or edge detection.

Clause 14. A method for tissue treatment, the method comprising receiving a first tissue slice and a second tissue slice, imaging the first tissue slice and the second tissue slice, obtaining a first image and a second image, obtaining a first location on the first image, registering the first image and the second image according to a method of any one of clauses 1-13, transferring the first location on the first image to a second location on the second image according to the image registration, chemically or physically treating the second tissue slice at the second location using a motorized treatment tip.

Clause 15. A method for tissue treatment as in Clause 14, wherein the first tissue slice is received on a first slide, and the second tissue slice is received on a second slide.

Clause 16. An image registration system, the system comprising a communication interface configured for obtaining a first image and a second image, and a processor system configured for determining a rotation angle (722) and subsequently determining a translation vector (724), the rotation angle and translation vector together defining an alignment transformation between the first image and the second image, wherein determining the rotation angle comprises iterating (730) over multiple potential rotation angles, wherein an iteration for a potential rotation angle comprises rotating (732) the first image over the potential rotation angle, and determining (734) alignment between the rotated first image and the second image, and selecting (740) the rotation angle with best alignment.

Clause 17. A tissue treatment system, the system comprising a platform arranged for receiving a first tissue slice and a second tissue slice, a camera configured for imaging the first tissue slice and the second tissue slice, obtaining a first image and a second image, a processor system configured for obtaining a first location on the first image, registering the first image and the second image according to a method of any one of clauses 1-13, transferring the first location on the first image to a second location on the second image according to the image registration, and a motorized treatment tip arranged for chemically or physically treating the second tissue slice at the second location.

Clause 18. A transitory or non-transitory computer readable medium (1000) comprising data (1020) representing instructions, which when executed by a processor system, cause the processor system to perform the method according to any one of clauses 1-15.

Clause 19. A computer-implemented image registration method, the method comprising obtaining (710) a first image and a second image, the first image being a bright field image and the second image being a dark field image, the first image is a stained tissue image and the second image is an unstained tissue image, preprocessing the first image by background subtraction, and determining a rotation angle (722) and subsequently determining a translation vector (724), the rotation angle and translation vector together defining an alignment transformation between the first image and the second image, wherein determining the rotation angle comprises iterating (730) over multiple potential rotation angles, wherein an iteration for a potential rotation angle comprises rotating (732) the first or second image over the potential rotation angle, and determining (734) alignment between the rotated image and the not-rotated image, wherein alignment between the rotated image and the not-rotated image is determined using phase correlation, and selecting (740) the rotation angle with best alignment.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented image registration method, the method comprising:

obtaining a first image and a second image, the first image being a bright field image and the second image being a dark field image, preprocessing the first image by background subtraction, and determining a rotation angle without using a log-polar transform and subsequently determining a translation vector, the rotation angle and translation vector together defining an alignment transformation between the first image and the second image, wherein determining the rotation angle comprises iterating over multiple potential rotation angles, wherein an iteration for a potential rotation angle comprises:

rotating the first or second image over the potential rotation angle, determining alignment between the rotated image and the not-rotated image, wherein alignment between the rotated image and the not-rotated image is determined using phase correlation, and selecting the rotation angle with best alignment.

2. An image registration method as in claim 1, wherein the first image is a stained tissue image and the second image is an unstained tissue image.

3. An image registration method as in claim 1, comprising:

computing the discrete Fourier transform of the rotated image and of the not-rotated image, multiplying said discrete Fourier transforms, and computing the inverse discrete Fourier transform of said multiplication, and selecting the largest value in said inverse discrete Fourier transform as a measure for alignment.

4. An image registration method as in claim 1, wherein the subsequent determining of the translation vector comprises iterating over multiple potential translation vectors, wherein an iteration for a potential translation vector comprises:

translating the rotated image over the potential translation vector, and determining alignment between the translated, rotated image and the not-rotated image, and selecting the translation vector with best alignment.

5. An image registration method as in claim 4, comprising computing the correlation between the translated, rotated image and the not-rotated image to determine their alignment.

6. An image registration method as in claim 1, wherein the first image and second image are images of different slices of the same tissue sample.

7. An image registration method as in claim 1, comprising:

obtaining a first exclusion area in the first image and/or a second exclusion area in the second image, and disregarding the first and/or second exclusion area when determining alignment.

8. An image registration method as in claim 1, wherein the first and second image are downsampled before determining the rotation angle.

9. An image registration method as in claim 8, wherein rotating or translating the first or second image comprises subpixel interpolation, and/or repeating the determining of the rotation angle and/or of the translation vector without said downsampling.

10. An image registration method as in claim 1, identifying a tissue slice from multiple tissue slices in the first and/or second image, and cropping the image to the identified tissue slice.

11. An image registration method as in claim 1, wherein the first image and the second image are obtained from a camera, the image registration method comprising:

determining a quality indicator from at least the determined alignment, and if the quality indicator is below a threshold, enable taking new images with different imaging parameters by the camera.

12. An image registration method as in claim 1, comprising preprocessing the first image and/or the second image by edge detection.

13. A method for tissue treatment, the method comprising:

receiving a first tissue slice and a second tissue slice, imaging the first tissue slice and the second tissue slice, obtaining a first image and a second image, the first image being a bright field image and the second image being a dark field image, obtaining a first location on the first image, registering the first image and the second image according to a method of claim 1, transferring the first location on the first image to a second location on the second image according to the image registration, and chemically or physically treating the second tissue slice at the second location using a motorized treatment tip.

14. A method for tissue treatment as in claim 13, wherein the first tissue slice is received on a first slide, and the second tissue slice is received on a second slide.

15. An image registration system, the system comprising:

a communication interface configured for obtaining a first image and a second image, the first image being a bright field image and the second image being a dark field image, and a processor system configured for preprocessing the first image by background subtraction, determining a rotation angle without using a log-polar transform and subsequently determining a translation vector, the rotation angle and translation vector together defining an alignment transformation between the first image and the second image, wherein determining the rotation angle comprises iterating over multiple potential rotation angles, wherein an iteration for a potential rotation angle comprises:

rotating the first or second image over the potential rotation angle, and determining alignment between the rotated image and the not-rotated image, wherein alignment between the rotated image and the not-rotated image is determined using phase correlation, and selecting the rotation angle with best alignment.

16. A tissue treatment system, the system comprising:

a platform arranged for receiving a first tissue slice and a second tissue slice, a camera configured for imaging the first tissue slice and the second tissue slice, obtaining a first image and a second image, the first image being a bright field image and the second image being a dark field image, a processor system configured for obtaining a first location on the first image, registering the first image and the second image according to a method of claim 1, transferring the first location on the first image to a second location on the second image according to the image registration, and a motorized treatment tip arranged for chemically or physically treating the second tissue slice at the second location.

17. A non-transitory computer readable medium comprising data representing instructions, which when executed by a processor system, cause the processor system to perform the method according to claim 1.

18. An image registration method as in claim 7, wherein the first exclusion area in the first image and/or the second exclusion area in the second image is defined by a machine learning algorithm.

19. An image registration method as in claim 1, comprising iterating over combinations of a scale factor and a rotation, rotating the first or second image over the potential rotation angle further comprises scaling with the scale factor, the method comprises determining alignment between the rotated and scaled image and the not-rotated not-scaled image, wherein alignment is determined using phase correlation.

* * * * *